US012658469B2

(12) United States Patent　　　(10) Patent No.:　　US 12,658,469 B2
Matsuda et al.　　　　　　　　　　(45) Date of Patent:　　　Jun. 16, 2026

(54) SOLID ELECTROLYTE, ELECTRODE FOR LITHIUM ION BATTERY, AND LITHIUM ION BATTERY

(71) Applicants: National University Corporation TOYOHASHI UNIVERSITY OF TECHNOLOGY, Toyohashi (JP); TOYOTA JIDOSHA KABUSHIKI KAISHA, Toyota (JP)

(72) Inventors: Atsunori Matsuda, Toyohashi (JP); Hiroyuki Muto, Toyohashi (JP); Phuc Huu Huy Nguyen, Toyohashi (JP)

(73) Assignees: National University Corporation TOYOHASHI UNIVERSITY OF TECHNOLOGY, Toyohashi (JP); TOYOTA JIDOSHA KABUSHIKI KAISHA, Toyota (JP)

( * ) Notice: Subject to any disclaimer, the term of this patent is extended or adjusted under 35 U.S.C. 154(b) by 837 days.

(21) Appl. No.: 17/436,926

(22) PCT Filed: Mar. 6, 2020

(86) PCT No.: PCT/JP2020/009790
§ 371 (c)(1),
(2) Date: Sep. 7, 2021

(87) PCT Pub. No.: WO2020/184464
PCT Pub. Date: Sep. 17, 2020

(65) Prior Publication Data
US 2022/0173430 A1　　Jun. 2, 2022

(30) Foreign Application Priority Data

Mar. 8, 2019　(JP) ................................. 2019-042263

(51) Int. Cl.
　*H01M 10/0562*　　(2010.01)
　*H01M 10/0525*　　(2010.01)

(52) U.S. Cl.
　CPC .... *H01M 10/0562* (2013.01); *H01M 10/0525* (2013.01); *H01M 2300/008* (2013.01)

(58) Field of Classification Search
　CPC ......... H01M 10/0562; H01M 10/0525; H01M 2300/008; H01M 2300/002; C01B 25/14; H01B 1/06; H01B 1/10
　See application file for complete search history.

(56) References Cited

U.S. PATENT DOCUMENTS

2020/0006808 A1 * 1/2020 Utsuno .................. H01B 13/00
2020/0119395 A1 * 4/2020 Chang ................. H01M 10/056
(Continued)

FOREIGN PATENT DOCUMENTS

JP　　2003206110　　7/2003
JP　　2011028893　　2/2011
(Continued)

OTHER PUBLICATIONS

Japanese Office Action issued Feb. 20, 2024 in Application No. 2021-505040.
(Continued)

*Primary Examiner* — Matthew T Martin
*Assistant Examiner* — Bartholomew A Hornsby
(74) *Attorney, Agent, or Firm* — Sughrue Mion, PLLC

(57)　　　　　ABSTRACT

The solid electrolyte of the present disclosure includes at least one compound selected from a group including (A) a compound in which a part of Li atom in $Li_3PS_4$ is substituted with a polyvalent atom (provided that Mg is excluded); (B) a compound in which a part of Li atom in $Li_6PS_5X$ (X: Cl, Br or I) is substituted with a polyvalent atom; and (C) a
(Continued)

compound in which a part of Li atom in $Li_7P_3S_{11}$ is substituted with a polyvalent atom.

17 Claims, 16 Drawing Sheets

(56)                     References Cited

U.S. PATENT DOCUMENTS

2020/0185768 A1*   6/2020   Kang  ................. H01M 10/052
2020/0194827 A1*   6/2020   Seong  ................... C01B 17/42
2022/0208410 A1*   6/2022   Li  ....................... H01M 10/056

FOREIGN PATENT DOCUMENTS

JP        2011-124081  A      6/2011
JP          2013041749        2/2013
JP          2016062718        4/2016
JP          2016062720        4/2016
JP        2016-134316  A      7/2016
WO          2018164224        9/2018

OTHER PUBLICATIONS

Communication dated Feb. 28, 2024 issued by the State Intellectual Property Office of the P.R.China in application No. 202080018914. 4.
Chinese Office Action dated May 30, 2024 in Application No. 202080018914.4.
Chinese Office Action issued Aug. 9, 2023 in Application No. 202080018914.4.

* cited by examiner

SOLID ELECTROLYTE, ELECTRODE FOR LITHIUM ION BATTERY, AND LITHIUM ION BATTERY

CROSS-REFERENCE TO RELATED APPLICATION

This application is a national phase of International Application No. PCT/JP2020/009790 filed on Mar. 6, 2020, which claims priority to Japanese Patent Application No. 2019-042263 filed on Mar. 8, 2019, the entire contents of which are herein incorporated by reference.

TECHNICAL FIELD

The present disclosure relates to a solid electrolyte which is suitable as a material for forming an electrolyte layer or an electrode such as a positive electrode constituting a lithium ion battery, an electrode for a lithium ion battery, and a lithium ion battery.

BACKGROUND ART

The lithium ion battery is a secondary battery having a function in which lithium is desorbed as ions from a positive electrode and moved to a negative electrode to be stored during charging, and lithium ions are inserted from the negative electrode to the positive electrode and returned during discharging. This lithium ion battery conventionally has characteristics such as high energy density and long life. Therefore, it has been widely used as a power source for home electric appliances such as personal computers and cameras, portable electronic devices or communication devices such as mobile phones, electric tools such as power tools, and the like, and recently applied to large batteries mounted on electric vehicles (EV), hybrid electric vehicles (HEV), and the like. In such a lithium ion battery, when a solid electrolyte is used instead of an electrolytic solution containing a flammable organic solvent, not only simplification of a safety device is achieved, but also production cost, productivity, and the like are excellent, and thus, various materials is actively studied. In particular, a solid electrolyte containing a sulfide leads to high conductivity (lithium ion conductivity), and is said to be useful for achieving high output of a battery.

A sulfide solid electrolyte containing a lithium element, a phosphorus element, and a sulfur element is known as the sulfide solid electrolyte.

For example, Patent document 1 discloses a lithium magnesium thiophosphate compound which is characterized by being represented by a general formula $Li_{4-2x}Mg_xP_2S_6$ (provided that $0<x<2$), and describes that the conductivity of a compound with $x=2/3$ is slightly less than $2.0×10^{-6}$ S/cm.

Patent document 2 discloses an all-solid-state battery system including which is characterized in that an all-solid-state battery includes a positive electrode active material layer containing a positive electrode active material, a negative electrode active material layer containing a negative electrode active material, and a solid electrolyte layer formed between the positive electrode active material layer and the negative electrode active material layer, and a heating means for heating the all-solid-state battery to 40° C. or higher, and that at least one of the positive electrode active material layer, the negative electrode active material layer, and the solid electrolyte layer contains a sulfide solid electrolyte material substantially having no crosslinking sulfur. Further, it describes that a preferred sulfide solid electrolyte material is a $Li_2S—P_2S_5$ material, a $Li_2S—SiS_2$ material, a $Li_2S—GeS_2$ material, or a $Li_2S—Al_2S_3$ material, and that a preferred ionic conductivity at room temperature is not less than $10^4$ S/cm.

Patent document 3 discloses a sulfide solid electrolyte material characterized by having, as a main component, a crystal phase in which a Li element at a 2a site of a $\gamma$-$Li_3PS_4$ crystal phase is substituted with an M element (the element M is at least one of a Cu (I) element, a Mg element, and a Ca element), and describes that a preferred ionic conductivity at 25° C. is not less than $1×10^{-3}$ S/cm.

Patent document 4 discloses a sulfide solid electrolyte material characterized by including a Li element, a Mg element, a P element, and a S element, having a $PS_4^{3-}$ structure as a main anionic structure, and having a ratio of the Mg element to a total of the Li element and the Mg element in a range from 1.69% to 5.26% by mol, and describes that a preferable ionic conductivity at 25° C. is not less than $1×10^{-3}$ S/cm.

PRIOR TECHNICAL DOCUMENT

Patent Document

Patent document 1: JP-A 2003-206110
Patent document 2: JP-A 2011-28893
Patent document 3: JP-A 2016-62718
Patent document 4: JP-A 2016-62720

SUMMARY OF DISCLOSURE

Technical Problems

In recent years, applications are increased in which a lithium ion battery is effectively used under a condition of 50° C. or higher, the condition being advantageous in conductivity by taking advantage of stability of a solid electrolyte. A solid electrolyte constituting a lithium ion battery corresponding to such applications is required. An object of the present disclosure is to provide a solid electrolyte having high conductivity at a temperature of 90° C., and an electrode for a lithium ion battery and a lithium ion battery including the solid electrolyte.

Solutions to Problems

The present disclosure is indicated below.
[1] A solid electrolyte characterized by comprising at least one compound selected from a group consisting of the following compounds (A), (B), and (C):
(A) a compound in which a part of Li atom in $Li_3PS_4$ is substituted with a polyvalent atom (provided that Mg is excluded);
(B) a compound in which a part of Li atom in $Li_6PS_5X$ (X: Cl, Br or I) is substituted with a polyvalent atom; and
(C) a compound in which a part of Li atom in $Li_7P_3S_{11}$ is substituted with a polyvalent atom.
[2] The solid electrolyte according to [1] above, wherein the polyvalent atom is derived from a Group 2 element, a Group 3 element, a Group 12 element, or a Group 13 element in the periodic table.
[3] The solid electrolyte according to [1] or [2] above, wherein the polyvalent atom is at least one type of atom selected from a group consisting of Ca, Sr, Ba, Zn, Y and Al.
[4] The solid electrolyte according to any one of [1] to [3] above, wherein the polyvalent atom in the compound (A) is at least one type of atom selected from a group consisting of Ca and Al.

[5] The solid electrolyte according to any one of [1] to [3] above, wherein the polyvalent atom in the compound (B) is at least one type of atom selected from a group consisting of Ca, Sr, Ba, Zn, Y and Al.

[6] The solid electrolyte according to any one of [1] to [3], wherein the polyvalent atom in the compound (C) is at least one type of atom selected from a group consisting of Ca, Zn and Al.

[7] The solid electrolyte according to [4] or [6] above, wherein the compounds (A) or (C) further comprise at least one type of halogen atom selected from a group consisting of F, Cl, Br and I.

[8] The solid electrolyte according to any one of [1] to [7] above, wherein a conductivity at a temperature of 90° C. is $6 \times 10^{-3}$ S/cm or higher.

[9] An electrode for a lithium ion battery characterized by comprising the solid electrolyte according to any one of claims [1] to [8].

[10] A lithium ion battery characterized by comprising the electrode for a lithium ion battery according to claim 9.

Advantageous Effects of Disclosure

The solid electrolyte of the present disclosure is suitable as a material for forming an electrode constituting a lithium ion battery having, for example, a heating means, and can provide a solid battery having high lithium ion conductivity and exhibiting excellent battery performance at a temperature of 50° C. or higher.

DETAILED DESCRIPTION

Figure 1:
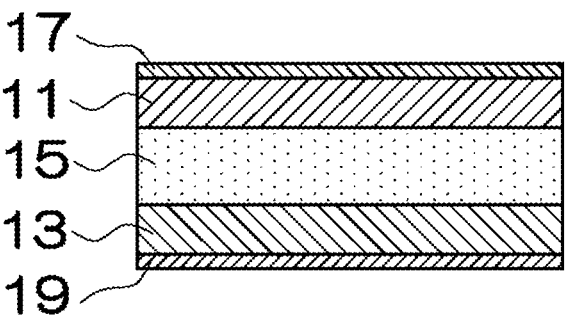
FIG. 1 is a schematic cross-sectional view showing a main part of a lithium ion battery of the present disclosure.

The solid electrolyte of the present disclosure includes at least one compound selected from a group consisting of the following compounds (A), (B), and (C):

(A) a compound in which a part of Li atom in $Li_3PS_4$ is substituted with a polyvalent atom (provided that Mg is excluded);

(B) a compound in which a part of Li atom in $Li_6PS_5X$ (X: Cl, Br or I) is substituted with a polyvalent atom; and (C) a compound in which a part of Li atom in $Li_7P_3S_{11}$ is substituted with a polyvalent atom.

The ionic conductivity (σ) of a solid electrolyte material generally follows the following formula with respect to a temperature (T). Therefore, the Li ionic conductivity of the solid electrolyte material increases as the temperature increases. Here, E represents an apparent activation energy of conduction, and R represents a gas constant.

$$\ln(\sigma) = -E/(R \cdot T) + \ln(a)$$

In case of a liquid electrolyte, decomposition of an electrolytic solution becomes remarkable in a high temperature range of 50° C. or higher, and thus it is difficult to use the liquid electrolyte in a high temperature range. On the other hand, in case of a solid electrolyte, there is no such stability problem, and thus a high temperature range advantageous for conductivity can be used. When such a high temperature range is actually used, considering influences on peripheral members, it is difficult to use water at 100° C. or higher, for example, because water boils. The compounds (A), (B), and (C) having a high conductivity at a temperature of 90° C. are very easy to use and become advantageous electrolytes when applications thereof are considered.

The present inventors consider that a conduction mechanism different from ion conduction by Li ions in a conventionally known solid electrolyte acts on the compounds (A), (B) and (C), and thus an unconventionally high conductivity is exhibited at a temperature of 90° C. For example, when a monovalent Li ion is replaced with a divalent Ca ion, two monovalent Li ions are removed. Ca ions enter one of them, and the other becomes a vacancy. It is presumed that hopping conduction acts through the vacancy.

In one or more embodiments, the polyvalent atom in the compounds (A), (B), and (C) is derived from a Group 2 element, a Group 3 element, a Group 12 element, or a Group 13 element in the periodic table. That is, the valence of the polyvalent atom is divalent or trivalent in one or more embodiments.

The chemical formulae of the compounds (A), (B), and (C) can be expressed depending on valence number of the contained polyvalent atoms, and the chemical formulae in the case of containing a polyvalent atom such as a divalent atom and a trivalent atom are described below.

Examples of the compound (A) include compounds represented by the following general formulae (1) and (2).

$$Li_{3-2a}M^1{}_aPS_4 \qquad (1)$$

(In the formula, $M^1$ is a divalent atom except Mg, and $0.001 \leq a \leq 0.2$.)

$$Li_{3-3b}M^2{}_bPS_4 \qquad (2)$$

(In the formula, $M^2$ is a trivalent atom, and $0.001 \leq b \leq 0.15$.)

In the general formula (1), in embodiments, $M^1$ is at least one selected from Ca, Sr, Ba, Ra, Zn and Cd, in embodiments, at least one selected from Ca, Sr, Ba and Zn, and in embodiments, Ca. Additionally, in embodiments, a in the formula satisfies $0.005 \leq a \leq 0.15$.

In the general formula (2), in embodiments, $M^2$ is at least one selected from Sc, Y, Al, Ga and In, in embodiments, at least one selected from Y and Al, and in embodiments, Al. Additionally, in embodiments, b in the formula satisfies $0.005 \leq b \leq 0.1$.

The compound (A) may further contain at least one halogen atom selected from F, Cl, Br, and I with respect to the atoms represented by the general formulae (1) and (2). In embodiments, a constituent proportion of the halogen atoms is in a range from 0.003 to 0.1 mol with respect to 1 mol of Li atom. In this case, a molar ratio of P and S may deviate from the definitions of the general formulae Examples of the compound (B) include compounds represented by the following general formulae (3) and (4).

$$Li_{6-2c}M^3{}_cPS_5X \qquad (3)$$

(In the formula, $M^3$ is a divalent atom, X is Cl, Br or I, and $0.001 \leq c \leq 0.2$.)

$$Li_{6-3d}M^4{}_dPS_5X \qquad (4)$$

(In the formula, $M^4$ is a trivalent atom, X is Cl, Br or I, and $0.001 \leq d \leq 0.15$.)

In the general formula (3), in embodiments, $M^3$ is at least one selected from Mg, Ca, Sr, Ba, Ra, Zn and Cd, in embodiments, at least one selected from Mg, Ca, Sr, Ba and Zn, and in embodiments, at least one selected from Ca, Sr, Ba and Zn. Additionally, in embodiments, c in the formula satisfies $0.005 \leq c \leq 0.15$.

In the general formula (4), in embodiments, $M^4$ is at least one selected from Sc, Y, Al, Ga and In, and in embodiments, at least one selected from Y and Al. Additionally, in embodiments din the formula satisfies $0.005 \leq d \leq 0.1$.

Examples of the compound (C) include compounds represented by the following general formulae (5) and (6).

$$Li_{7-2e}M^5{}_eP_3S_{11} \qquad (5)$$

(In the formula, $M^5$ is a divalent atom, and $0.001 \leq e \leq 0.1$)

$$Li_{7-3f}M^6{}_fP_3S_{11} \qquad (6)$$

(In the formula, $M^6$ is a trivalent atom, and $0.001 \leq f \leq 0.05$)

In the general formula (5), in embodiments, $M^5$ is at least one selected from Mg, Ca, Sr, Ba, Ra, Zn and Cd, in embodiments, at least one selected from Mg, Ca, Sr, Ba and Zn, and in embodiments at least one selected from Ca and Zn. Additionally, in embodiments e in the formula satisfies $0.005 \leq e \leq 0.05$.

In the general formula (6), in embodiments, $M^6$ is at least one selected from Sc, Y, Al, Ga and In, in embodiments, at least one selected from Y and Al, and in embodiments, Al. Additionally, in embodiments, f in the formula satisfies $0.005 \leq f \leq 0.03$.

The compound (C) may further contain at least one halogen atom selected from F, Cl, Br, and I with respect to the atoms represented by the general formulae (5) and (6). In embodiments, a constituent proportion of the halogen atoms is in a range from 0.001 to 0.014 mol with respect to 1 mol of Li atom. In this case, a molar ratio of P and S may deviate from the definitions of the general formulae In the general formulae (1) to (6), anion atoms other than P, S, and X may be included as long as the performance is not deteriorated, and a ratio among P, S, and X may deviate from the general formulae in accordance with a ratio of the anion atoms. A constituent proportion of the anion atoms that do not deteriorate the performance is 0.1 mol or less based on 1 mol of Li atoms.

The compounds (A), (B) and (C) may be either crystalline or amorphous.

The compounds (A), (B), and (C) can be produced by performing a contact reaction between compound raw materials containing elements constituting each compound so that the molar ratio of each element becomes a predetermined value.

Examples of the compound raw materials include $Li_2S$, phosphorus sulfide ($P_2S_5$, $P_4S_3$, $P_4S_7$, etc), and lithium halide LiX (Lithium chloride, lithium bromide, lithium iodide, etc).

Examples of the compound raw materials containing a polyvalent atom include sulfides, thiophosphoric acid compounds, and halides.

From a viewpoint of reactivity, the compound raw materials are ,in embodiments, fine particles. In embodiments, an upper limit of a maximum length of the particles is 100 μm, and in embodiments, 50 μm. However, a lower limit is usually 0.01 μm. When the size of the raw materials is large, for example, the raw materials may be used after grinding the raw materials with a mortar and a pestle so that the size of the raw materials falls within the range.

In a contact reaction for producing the compound (A), (B), or (C), a ball mill (planetary ball mill or the like), a vibration mill, a turbo mill, a mechanofusion, a disk mill, or the like may be used. A method for using the compound raw materials is not particularly limited. All the raw materials may be subjected to a contact reaction using the total amount of the raw materials, or may be subjected to a contact reaction while types or supply amounts of the raw materials are changed stepwise.

The atmosphere of the reaction system in the contact reaction is not particularly limited, and may be composed of an inert gas such as nitrogen gas and argon gas, dry air, or the like.

The contact reaction may be performed in the presence of a solvent. Examples of the solvent include alcohols, carboxylic acids, carboxylic acid esters, ethers, aldehydes, ketones, carbonic acid esters, nitriles, amides, nitrites, phosphoric acid esters, halogenated hydrocarbons, and the like.

When the contact reaction is performed in the presence of a solvent for the production of the compound (A) or (B), a suspension containing the compound (A) or (B) is usually obtained. After that, the solvent is removed to prepare a solid composition containing the compound (A) or (B).

Examples of the method for removing the solvent include a method of drying at a temperature of lower than 100° C., and in embodiments, a method of drying at about 15° C. to 60° C. The solvent may be removed at either atmospheric pressure or reduced pressure. The atmosphere for removing the solvent under atmospheric pressure is dry air or an inert gas in embodiments. The solid composition obtained by removing the solvent may be further heat-treated.

When the compound (C) is produced, a heat-treated solid composition may be prepared by removing a solvent from a suspension obtained in the same manner as those for the compounds (A) and (B). Examples of a method of removing the solvent from the suspension include a method of drying under reduced pressure at a temperature ranging from, for example, 100° C. to 180° C. In the case the solid composition prepared by removing the solvent is further heat-treated, a method of heat-treating the solid composition at a temperature ranging from 200° C. to 300° C. in dry air or an inert gas atmosphere can be applied.

When the compounds (A), (B) and (C) are produced by performing a contact reaction in the presence of the solvent, a method of performing a contact reaction, for example, in the case of using a solvent containing a saturated fatty acid ester or a dialkyl carbonate, while vibrating a slurry containing a reaction raw material and the solvent with a stirring blade, a stirrer, beads, balls, ultrasonic waves or the like without using a ball mill (planetary ball mill or the like) is applied in embodiments. When the contact reaction is performed by this method, the obtained suspension is dried at lower than 100° C., and in embodiments, about 15° C. to 60° C. to remove the solvent, whereby a solid composition can be obtained. The solvent may be removed at either atmospheric pressure or reduced pressure. The atmosphere for removing the solvent under atmospheric pressure is formed from dry air or an inert gas in embodiments. The solid composition obtained by removing the solvent may be further heat-treated.

The solid electrolyte of the present disclosure may further include other compound such as other solid electrolyte, a conductive aid and a binder so long as it includes at least one of the compounds (A), (B), and (C). In embodiments, an upper limit of a content of the other compound is 50% by mass %, and in embodiments, 30% by mass with respect to the whole solid electrolyte.

In the solid electrolyte of the present disclosure, the conductivity may be measured by an alternating current impedance method, and the conductivity at a temperature of 90° C. is higher than that when an unsubstituted compound is included. For example, in embodiments, conductivity of the solid electrolyte containing the compound (A) or (B) has high performance of $6×10^{-3}$ S/cm or higher, in embodiments, $8×10^{-3}$ S/cm or higher, and in embodiments, $1×10^2$ S/cm or higher. The conductivity of solid electrolyte containing the compound (C) at a temperature of 90° C. is ,in embodiments, $4.5×10^{-3}$ S/cm or higher, in embodiments, $6.0×10^{-3}$ S/cm or higher, and in embodiments, $9.0×10^{-3}$ S/cm or higher. Therefore, in embodiments, high conductivity can be obtained in a range including a temperature of 50° C. or higher, and in embodiments, 70° C. or higher.

The solid electrolyte of the present disclosure is suitable as a constituent material of an electrode such as positive electrode and negative electrode, or an electrolyte layer of a lithium ion battery. FIG. 1 is an example showing a cross section of a main part in a lithium ion battery including a positive electrode 11, a negative electrode 13, an electrolyte layer 15 disposed between the positive electrode 11 and the negative electrode 13, a positive electrode current collector 17 for collecting current of the positive electrode 11, and a negative electrode current collector 19 for collecting current of the negative electrode 15. The solid electrolyte of the present disclosure is suitable as a constituent material of the positive electrode 11, the solid electrolyte layer 15, the negative electrode 13, and the like for the lithium ion battery having such a configuration. It is particularly suitable for forming the positive electrode 11 and the solid electrolyte layer 15.

The positive electrode 11 and the negative electrode 13, which are the electrodes for a lithium ion battery of the present disclosure, usually include a positive electrode active material and a negative electrode active material, respectively, and may further include a binder, a conduction aid, any other solid electrolyte, and the like.

Examples of the binder include a fluorine-containing resin such as polytetrafluoroethylene polyhexafluoropropylene (PHFP), polyvinylidene fluoride (PVdF), and a vinylidene fluoride-hexafluoropropylene copolymer; a polyolefin-based resin such as polypropylene and polyethylene; an ethylene propylene non-conjugated diene rubber such as EPDM, a sulfonated EPDM, a natural butyl rubber (NBR), and the like.

As the conduction aid, those composed of a carbon material, a metal powder, a metal compound or the like may be used, and, among these, a carbon material is used in one or more embodiments. Examples of the carbon material include a plate-shaped conductive substance such as graphene; a linear conductive substance such as carbon nanotubes and carbon fibers; a carbon black such as Ketjen black, acetylene black, Denka black (trade name), thermal black, and channel black; a granular conductive substance such as graphite; and the like.

Examples of the positive electrode active material contained in the positive electrode 11 include an oxide (composite oxide)-based material such as $MoO_x$, $WO_x$, $VO_x$, $Li_xCoO_y$ ($LiCoO_2$, and the like), $Li_xMnO_y$ ($LiMnO_2$, $LiMn_2O_4$, and the like), $Li_xNiO_y$ ($LiNiO_2$, and the like), $Li_xVO_y$ ($LiVO_2$, and the like), $Li_xMn_yNi_zCo_wO$ ($LiNi_{1/3}Co_{1/3}Mn_{1/3}O_2$, and the like), $Li_xFeP_xO_y$ ($LiFePO_4$, and the like), $Li_xMnP_xO_y$ ($LiMnPO_4$, and the like), $Li_xNiP_xO_y$ ($LiNiPO_4$, and the like), and $Li_xCuP_xO_y$ ($LiCuPO_4$, and the like); a sulfide-based material such as $MoS_x$, $CuS_x$, $TiS_x$, $WS_x$, $Li_xS_y$ and $Li_xP_yS_z$; a selenide-based material; and the like.

Examples of the negative electrode active material contained in the negative electrode 13 include a carbon material; a metal such as lithium, indium, aluminum and silicon, or an alloy containing these metals; an oxide (composite oxide)-based material such as $Sn_xO_y$, $MoO_x$, $WO_x$, $Li_xCoO_y$ ($LiCoO_2$, and the like), $Li_xMn_yNi_zCo_wO$ ($LiNi_{1/3}Co_{1/3}Mn_{1/3}Mn_{1/3}O_2$, and the like), $Li_xCuP_xO_y$ ($LiCuPO_4$, and the like); and the like.

The electrolyte layer 15 is not particularly limited so long as it includes a solid electrolyte, but is substantially composed of a solid electrolyte in one or more embodiments. In that case, the electrolyte layer may be composed only of the solid electrolyte of the present disclosure, or may be composed of the solid electrolyte of the present disclosure and other solid electrolyte.

The electrolyte layer 15 has usually a sheet shape.

The positive electrode current collector 17 or the negative electrode current collector 19 may be made of, for example, stainless steel, gold, platinum, copper, zinc, nickel, tin, aluminum, an alloy thereof, or the like. These current collectors may have a plate shape, a foil shape, a mesh shape, or the like.

As described above, the solid electrolyte of the present disclosure has a sufficiently high conductivity at a temperature of 90° C. Therefore, in embodiments, a lithium ion battery including an electrode or an electrolyte layer containing the solid electrolyte can exhibit excellent battery performance at a temperature of 50° C. or higher, and in embodiments, 70° C. or higher (provided that an upper limit is usually 250° C.). In embodiments, the lithium ion battery capable of exhibiting such an effect includes a means for heating the main part shown in FIG. 1.

The lithium ion battery of the present disclosure includes the electrode for a lithium ion battery of the present disclosure, and in embodiments, includes an electrolyte layer containing the solid electrolyte of the present disclosure.

When the lithium ion battery of the present disclosure includes a means for heating the main part shown in FIG. 1, the heating means is not particularly limited, but is a heating element in one or more embodiments. The configuration of the heating element is not particularly limited, but the heating element generates heat by electric resistance in one or more embodiments.

Since the main part shown in FIG. 1 is usually housed inside a housing (battery case), the heating element is disposed on an outer peripheral surface side of the main part and on an inner surface side, an inside, or an outside of the housing.

Figure 2:
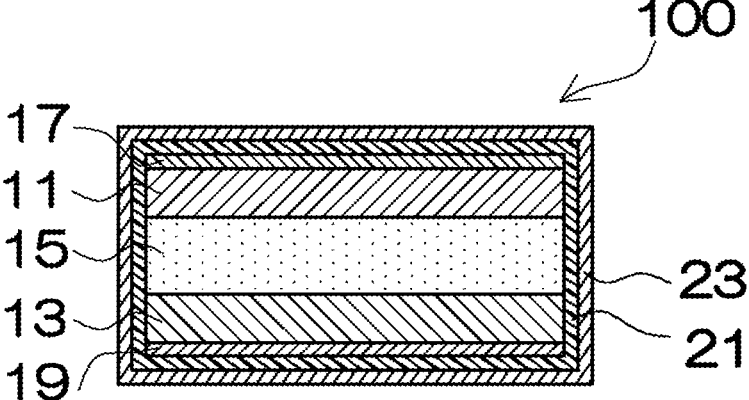
FIG. 2 is a schematic cross-sectional view showing an example of a lithium ion battery of the present disclosure including a heating means.
Figure 3:
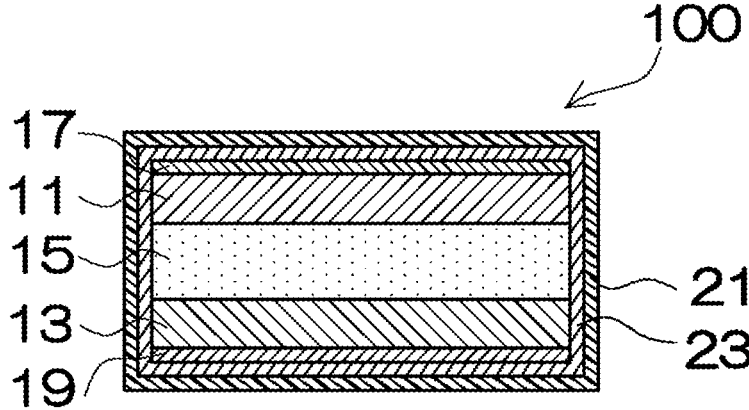
FIG. 3 is a schematic cross-sectional view showing another example of the lithium ion battery of the present disclosure including a heating means.

FIGS. 2 and 3 are schematic diagrams illustrating a lithium ion battery of the present disclosure.

FIG. 2 shows a lithium ion battery 100 including a positive electrode 11 containing a solid electrolyte glass and a positive electrode active material, a negative electrode 13 containing a solid electrolyte glass and a negative electrode active material, an electrolyte layer 15 disposed between the positive electrode 11 and the negative electrode 13, a positive electrode current collector 17 for collecting current of the positive electrode 11, a negative electrode current collector 19 for collecting current of the negative electrode 15, a housing 21 for housing these components, and a heating element 23 disposed on an outer surface of the housing 21. In FIG. 2, the heating element 23 covers the entire outer surface of the housing 21, but the present disclosure is not limited thereto, and the heating element 23 may cover a partial surface. In FIG. 2, the housing 21 and the heating element 23 are in contact with each other, but the present disclosure is not limited thereto, and a space may be provided between the housing 21 and the heating element 23.

Further, FIG. 3 shows a lithium ion battery 100 including a positive electrode 11 containing a solid electrolyte glass and a positive electrode active material, a negative electrode 13 containing a solid electrolyte glass and a negative electrode active material, an electrolyte layer 15 disposed between the positive electrode 11 and the negative electrode 13, a positive electrode current collector 17 for collecting current of the positive electrode 11, a negative electrode current collector 19 for collecting current of the negative electrode 15, a heating element 23 disposed on the outer surface of a main part composed of these components, and a housing 21 for housing the whole of these components. In FIG. 3, the heating element 23 covers the entire outer surface of the main part, but the present disclosure is not limited thereto.

EXAMPLES

1. Raw Material for Production

Raw materials used for production of solid electrolytes are as follows.

1-1. Lithium Sulfide ($Li_2S$) Powder

"$Li_2S$" (trade name) manufactured by Mitsuwa Chemicals Co., Ltd. was used. A purity is 99.9% and a particle size is about 50 μm.

1-2. Diphosphorus Pentasulfide ($P_2S_5$) Powder

"$P_2S_5$" (trade name) manufactured by Aldrich Corporation was used. A purity is 99%, and a particle size is 100 μm.

1-3. Calcium Sulfide (CaS) Powder

"CaS" (trade name) manufactured by Kojundo Chemical Lab. Co., Ltd. was used. A purity is 99.9% and a particle size is about 50 μm.

1-4. Aluminum Sulfide ($Al_2S_3$) Powder

"$Al_2S_3$" (trade name) manufactured by Kojundo Chemical Lab. Co., Ltd. was used. A purity is 98% and a particle size is about 50 μm.

1-5. Magnesium Sulfide (MgS) Powder

"MgS" (trade name) manufactured by Kojundo Chemical Lab. Co., Ltd. was used. A purity is 99.9%, and a particle size is several tens of μm.

1-6. Strontium Chloride ($SrCl_2$) Powder

"$SrCl_2$" (trade name) manufactured by Aldrich Corporation was used. A purity is 99.9%, and a particle size is several mm.

1-7. Barium Sulfide (BaS) Powder

"BaS" (trade name) manufactured by Kojundo Chemical Lab. Co., Ltd. was used. A purity is 99.9%, and a particle size is several tens of μm.

1-8. Zinc Chloride ($ZnCl_2$) Powder

"$ZnCl_2$" (trade name) manufactured by Kojundo Chemical Lab. Co., Ltd. was used. A purity is 99.9%, and a particle size is several mm.

1-9. Yttrium Chloride ($YCl_3$) Powder

"$YCl_3$" (trade name) manufactured by Kojundo Chemical Lab. Co., Ltd. was used. A purity is 99.9%, and a particle size is several mm.

1-10. Calcium Thiophosphate ($Ca_3(PS_4)_2$) Powder

A synthetic product obtained using a calcium sulfide (CaS) powder and a diphosphorus pentasulfide ($P_2S_5$) powder was used. A particle size is 20 μm.

1-11. Calcium Iodide ($CaI_2$) Powder

"$CaI_2$" (trade name) manufactured by Aldrich Corporation was used. A purity is 99.9%, and a particle size is several mm.

1-12. Calcium Fluoride ($CaF_2$) Powder

"$CaF_2$" (trade name) manufactured by Aldrich Corporation was used. A purity is 99.9%, and a particle size is several mm.

1-13. Calcium Chloride ($CaCl_2$) Powder

"$CaCl_2$" (trade name) manufactured by Aldrich Corporation was used. A purity is 99.9%, and the powder has a particle diameter passing through a screen no larger than 10 mesh.

1-14. Lithium Chloride (LiCl) Powder

"LiCl" (trade name) manufactured by FUJIFILM Wako Pure Chemical Corporation was used. A purity is 99.9%, and a particle size is several tens of μm.

1-15. Acetonitrile

"Acetonitrile" (trade name) manufactured by FUJIFILM Wako Pure Chemical Corporation was used. A purity is 99.9%.

1-16. Calcium Iodide ($CaI_2$) Powder

"$CaI_2$" (trade name) manufactured by Aldrich Corporation was used. A purity is 99.9%, and a particle size is several mm.

1-17. Aluminum Iodide ($AlI_3$) Powder

"$AlI_3$" (trade name) manufactured by Aldrich Corporation was used. A purity is 99.9%, and a particle size is several mm.

1-18. Zinc Iodide ($ZnI_2$) Powder

"$ZnI_2$" (trade name) manufactured by Aldrich Corporation was used. A purity is 99.9%, and a particle size is several mm.

2. Production and Evaluation of Solid Electrolytes

A solid electrolyte was produced using the above raw materials, and the conductivity was measured by the following method.

Method of Measuring Conductivity

The solid electrolyte was formed into a disk-shaped test piece (size: 5 mm in radius×0.6 mm in thickness) using a uniaxial hydraulic press machine. In a state where the test piece was placed in a measurement unit (glass container) under an argon gas atmosphere, a heat insulator and a ribbon heater connected to a temperature controller were wound around the measurement unit (glass container). The test piece was gradually heated from room temperature using IMPEDANCE ANALYZER "S 1260" (model name) manufactured by SOLATRON, and the conductivity was measured at temperatures of 50° C., 70° C., 90° C., 110° C., or 130° C. The conductivity was measured after the test piece was allowed to stand for 1 hour from the start of being held at each temperature. The conductivity was sequentially measured at each temperature from the low temperature side, but instead of performing the measurement while raising the temperature stepwise, for example, a method was adopted in which, after measurement of the conductivity at 50° C., the temperature was returned to 25° C. once, and raised to 70° C., and the conductivity was measured.

Experimental Example 1 (Production of $Li_3P_4$)

A lithium sulfide ($Li_2S$) powder and a diphosphorus pentasulfide ($P_2S_5$) powder were weighed so that a molar ratio of Li, P and S was 3:1:4, and these materials were mixed. Next, the mixed powder was put together with zirconia balls having a diameter of 15 mm into a planetary ball mill machine (container: made of zirconia) manufactured by Frisch, and mechanical milling was performed for 20 hours under the condition of a rotation speed of 600 rpm. The conductivity of the obtained reaction product (solid composition) as a solid electrolyte was measured and found to be $2.0×10^{-3}$ S/cm at a temperature of 90° C.

Experimental Example 2 (Production of $Li_{2.94}Mg_{0.03}PS_4$)

The same operation as in Experimental Example 1 was performed except that a lithium sulfide ($Li_2S$) powder, a magnesium sulfide (MgS) powder, and a diphosphorus pentasulfide ($P_2S_5$) powder were used so that a molar ratio of Li, Mg, P, and S was 2.94:0.03:1:4.

Figure 4:
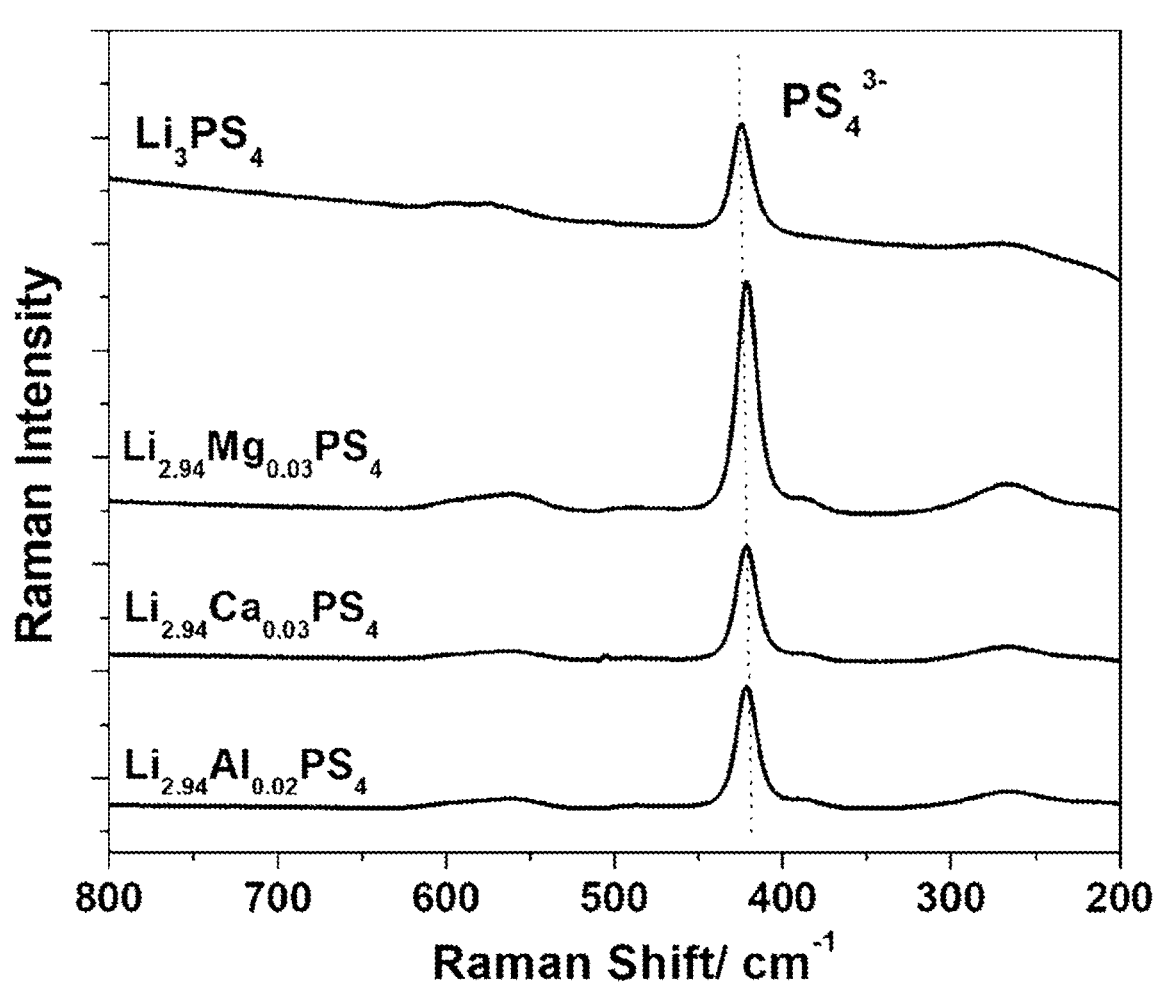
FIG. 4 is Raman spectra of solid compositions obtained in Experimental Examples 1 to 4.

As a result of X-ray diffraction measurement of the obtained reaction product (solid composition), the reaction product was found to be amorphous. Raman spectroscopic analysis was then performed, and, as a result, a peak attributed to $PS_4^{3-}$ was observed at around 420 $cm^{-1}$ in the obtained spectrum (see FIG. 4).

The conductivity of this solid composition as a solid electrolyte was measured and found to be $4.9×10^{-3}$ S/cm at a temperature of 90° C.

Experimental Example 3 (Production of $Li_{2.94}Ca_{0.03}PS_4$)

The same operation as in Experimental Example 1 was performed except that a lithium sulfide ($Li_2S$) powder, a calcium sulfide (CaS) powder, and a diphosphorus pentasulfide ($P_2S_5$) powder were used so that a molar ratio of Li, Ca, P, and S was 2.94:0.03:1:4.

As a result of X-ray diffraction measurement of the obtained reaction product (solid composition), the reaction product was found to be amorphous. Raman spectroscopic analysis was then performed, and, as a result, a peak attributed to $PS_4^{3-}$ was observed at around 420 cm in the obtained spectrum (see FIG. 4).

The conductivity of this solid composition as a solid electrolyte was measured and found to be $9.1×10^{-3}$ S/cm at a temperature of 90° C.

Experimental Example 4 (Production of $Li_{2.94}Al_{0.02}PS_4$)

The same operation as in Experimental Example 1 was performed except that a lithium sulfide ($Li_2S$) powder, an aluminum sulfide ($Al_2S_3$) powder, and a diphosphorus pentasulfide ($P_2S_5$) powder were used so that a molar ratio of Li, Al, P, and S was 2.94:0.02:1:4.

As a result of X-ray diffraction measurement of the obtained reaction product (solid composition), the reaction product was found to be amorphous. Raman spectroscopic analysis was then performed, and, as a result, a peak attributed to $PS_4^{3-}$ was observed at around 420 $cm^{-1}$ in the obtained spectrum (see FIG. 4).

The conductivity of this solid composition as a solid electrolyte was measured and found to be $9.9×10^{-3}$ S/cm at a temperature of 90° C.

Figure 5:
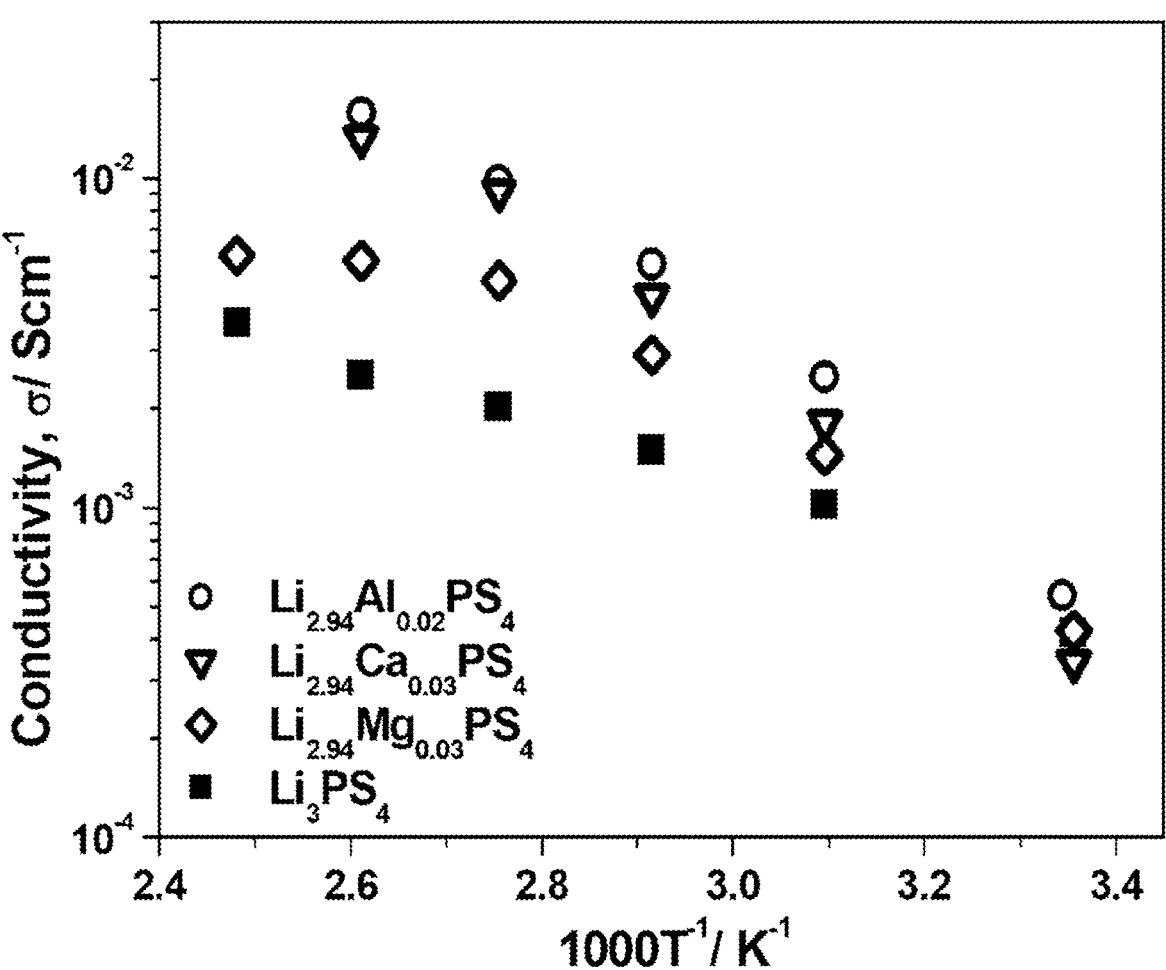
FIG. 5 is a graph showing temperature dependency of conductivity of solid electrolytes obtained in Experimental Examples 1 to 4.

FIG. 5 is a graph showing temperature dependency of the conductivity of solid electrolytes obtained in Experimental Examples 1 to 4.

Experimental Example 5 (Production of $Li_{2.94}Ca_{0.03}PS_4$)

The same operation as in Experimental Example 3 was performed except that a calcium thiophosphate ($Ca_3(PS_4)_2$) powder was used instead of the calcium sulfide (CaS) powder.

The conductivity of the obtained reaction product (solid composition) as a solid electrolyte was measured and found to be $9.1×10^{-3}$ S/cm at a temperature of 90° C.

Experimental Example 6 (Production of $Li_{2.94}Ca_{0.03}P_{0.98}S_{3.92}I_{0.06}$)

The same operation as in Experimental Example 3 was performed except that a calcium iodide ($CaI_2$) powder was used instead of the calcium sulfide (CaS) powder.

The conductivity of the obtained reaction product (solid composition) as a solid electrolyte was measured and found to be $8.9×10^{-3}$ S/cm at a temperature of 90° C.

Experimental Example 7 (Production of $Li_{2.94}Ca_{0.03}P_{0.98}S_{3.92}F_{0.06}$)

The same operation as in Experimental Example 3 was performed except that a calcium fluoride ($CaF_2$) powder was used instead of the calcium sulfide (CaS) powder.

The conductivity of the obtained reaction product (solid composition) as a solid electrolyte was measured and found to be $6.2×10^{-3}$ S/cm at a temperature of 90° C.

Figure 6:
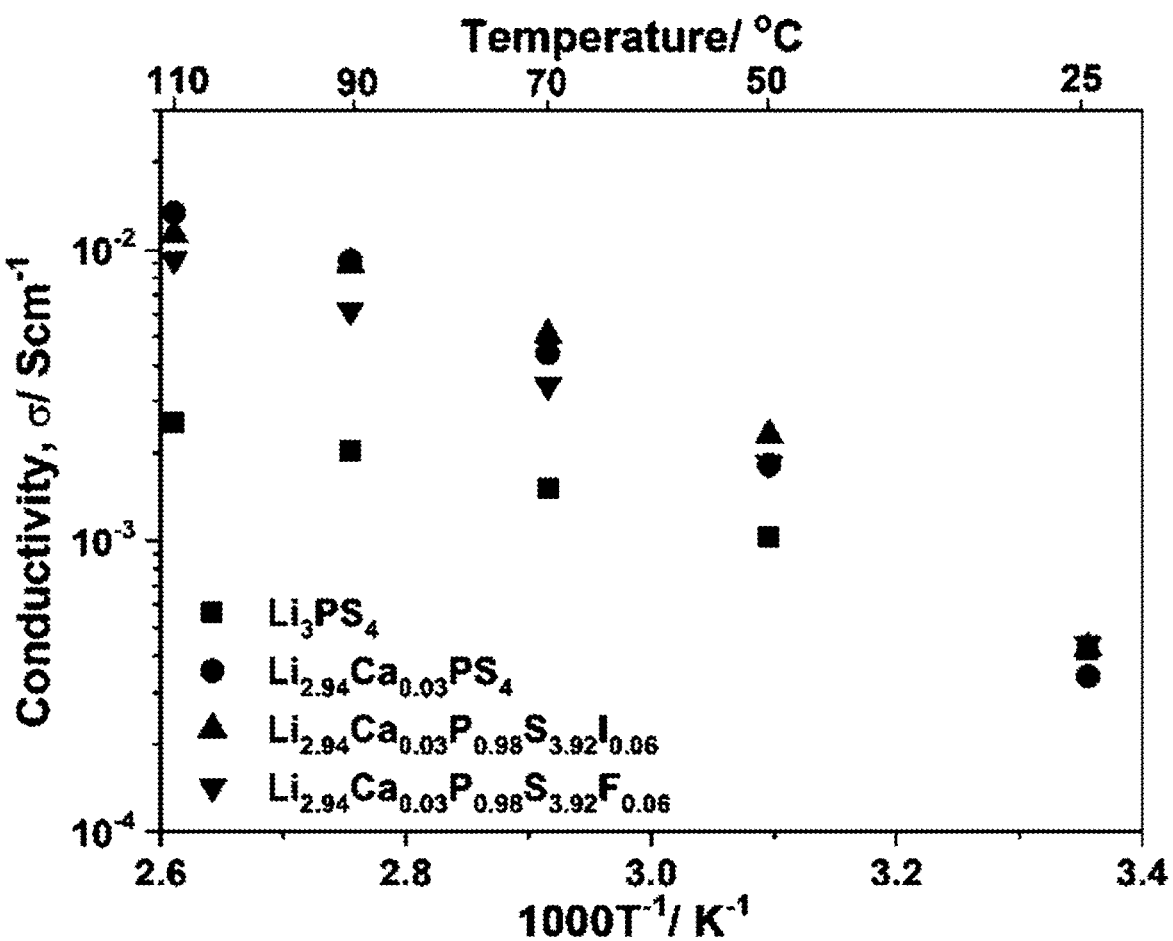
FIG. 6 is a graph showing temperature dependency of conductivity of solid electrolytes obtained in Experimental Examples 5 to 7.

FIG. 6 is a graph showing temperature dependency of the conductivity of solid electrolytes obtained in Experimental Examples 5 to 7.

Experimental Example 8 (Production of $Li_6PS_5Cl$)

A lithium sulfide ($Li_2S$) powder, a diphosphorus pentasulfide ($P_2S_5$) powder, and a lithium chloride (LiCl) powder were weighed so that a molar ratio of Li, P, S, and Cl was 6:1:5:1, and these materials were mixed. Next, the mixed powder was put together with zirconia balls having a diameter of 15 mm into a planetary ball mill machine (container: made of zirconia) manufactured by Frisch, and mechanical milling was performed for 20 hours under the condition of a rotation speed of 600 rpm.

The conductivity of the obtained reaction product (solid composition) as a solid electrolyte was measured and found to be $4.3 \times 10^{-3}$ S/cm at a temperature of 90° C.

Experimental Example 9 (Production of $Li_{5.98}Ca_{0.01}PS_5Cl$)

The same operation as in Experimental Example 8 was performed except that a lithium sulfide ($Li_2S$) powder, a diphosphorus pentasulfide ($P_2S_5$) powder, a lithium chloride (LiCl) powder, and a calcium chloride ($CaCl_2$) powder were used so that a molar ratio of Li, Ca, P, S, and Cl was 5.98:0.01:1:5:1.

Figure 7:
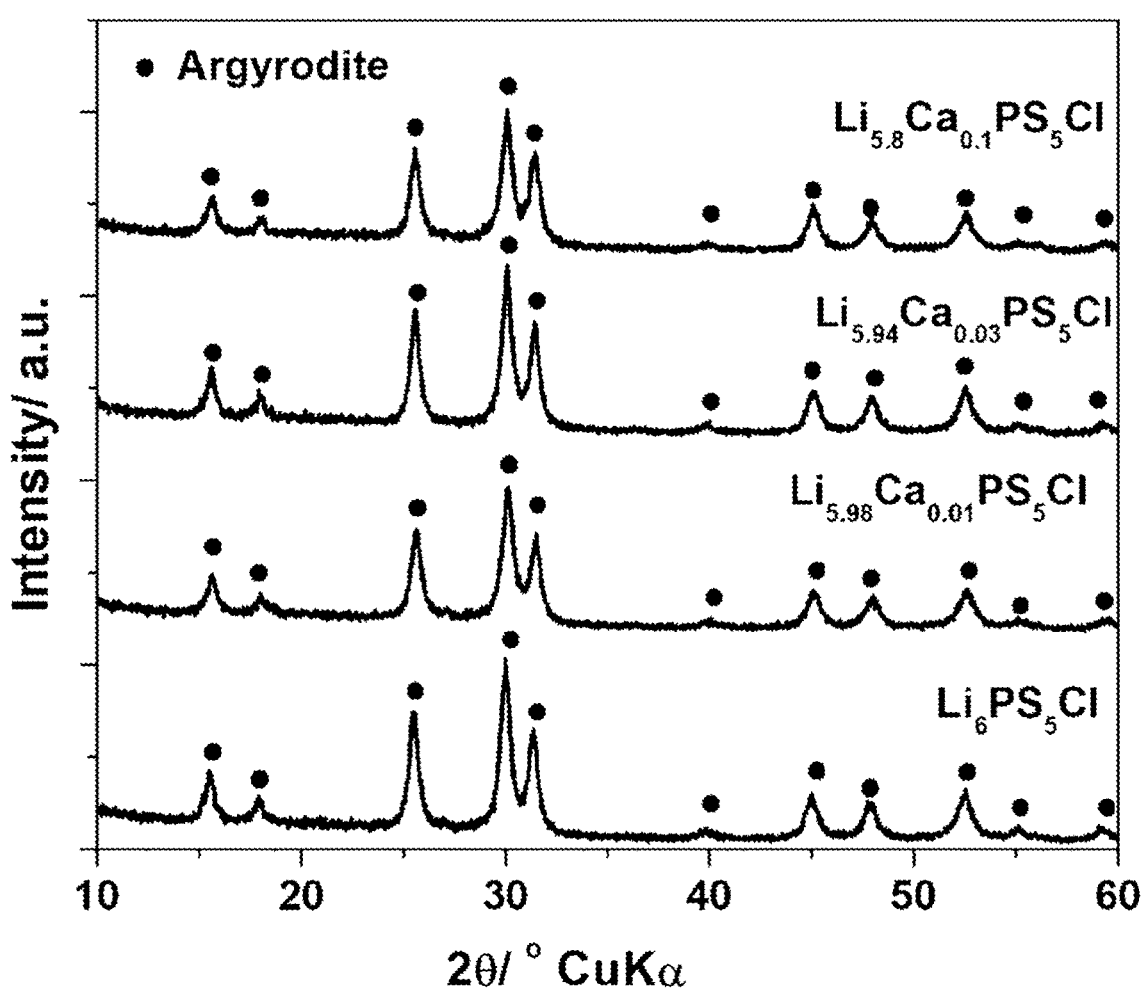
FIG. 7 shows X-ray diffraction images of solid compositions obtained in Experimental Examples 8, 9, 11 and 13.

As a result of X-ray diffraction measurement of the obtained reaction product (solid composition), the reaction product was found to have an argyrodite type crystal structure (see FIG. 7).

The conductivity of this solid composition as a solid electrolyte was measured and found to be $6.97 \times 10^{-3}$ S/cm at a temperature of 90° C.

Experimental Example 10 (Production of $Li_{5.96}Ca_{0.02}PS_5Cl$)

The same operation as in Experimental Example 9 was performed except that a lithium sulfide ($Li_2S$) powder, a diphosphorus pentasulfide ($P_2S_5$) powder, a lithium chloride (LiCl) powder, and a calcium chloride ($CaCl_2$) powder were used so that a molar ratio of Li, Ca, P, S, and Cl was 5.96:0.02:1:5:1.

The conductivity of the obtained reaction product (solid composition) as a solid electrolyte was measured and found to be $17.2 \times 10^{-3}$ S/cm at a temperature of 90° C.

Experimental Example 11 (Production of $Li_{5.94}Ca_{0.03}PS_5Cl$)

The same operation as in Experimental Example 9 was performed except that a lithium sulfide ($Li_2S$) powder, a diphosphorus pentasulfide ($P_2S_5$) powder, a lithium chloride (LiCl) powder, and a calcium chloride ($CaCl_2$) powder were used so that a molar ratio of Li, Ca, P, S, and Cl was 5.94:0.03:1:5:1.

As a result of X-ray diffraction measurement of the obtained reaction product (solid composition), the reaction product was found to have an argyrodite type crystal structure (see FIG. 7).

The conductivity of this solid composition as a solid electrolyte was measured and found to be $23.0 \times 10^{-3}$ S/cm at a temperature of 90° C.

Experimental Example 12 (Production of $Li_{5.9}Ca_{0.05}PS_5Cl$)

The same operation as in Experimental Example 9 was performed except that a lithium sulfide ($Li_2S$) powder, a diphosphorus pentasulfide ($P_2S_5$) powder, a lithium chloride (LiCl) powder, and a calcium chloride ($CaCl_2$) powder were used so that a molar ratio of Li, Ca, P, S, and Cl was 5.9:0.05:1:5:1.

The conductivity of the obtained reaction product (solid composition) as a solid electrolyte was measured and found to be $18.0 \times 10^{-3}$ S/cm at a temperature of 90° C.

Experimental Example 13 (Production of $Li_{5.8}Ca_{0.1}PS_5Cl$)

The same operation as in Experimental Example 9 was performed except that a lithium sulfide ($Li_2S$) powder, a diphosphorus pentasulfide ($P_2S_5$) powder, a lithium chloride (LiCl) powder, and a calcium chloride ($CaCl_2$) powder were used so that a molar ratio of Li, Ca, P, S, and Cl was 5.8:0.1:1:5:1.

As a result of X-ray diffraction measurement of the obtained reaction product (solid composition), the reaction product was found to have an argyrodite type crystal structure (see FIG. 7).

The conductivity of this solid composition as a solid electrolyte was measured and found to be $15.9 \times 10^{-3}$ S/cm at a temperature of 90° C.

Figure 8:
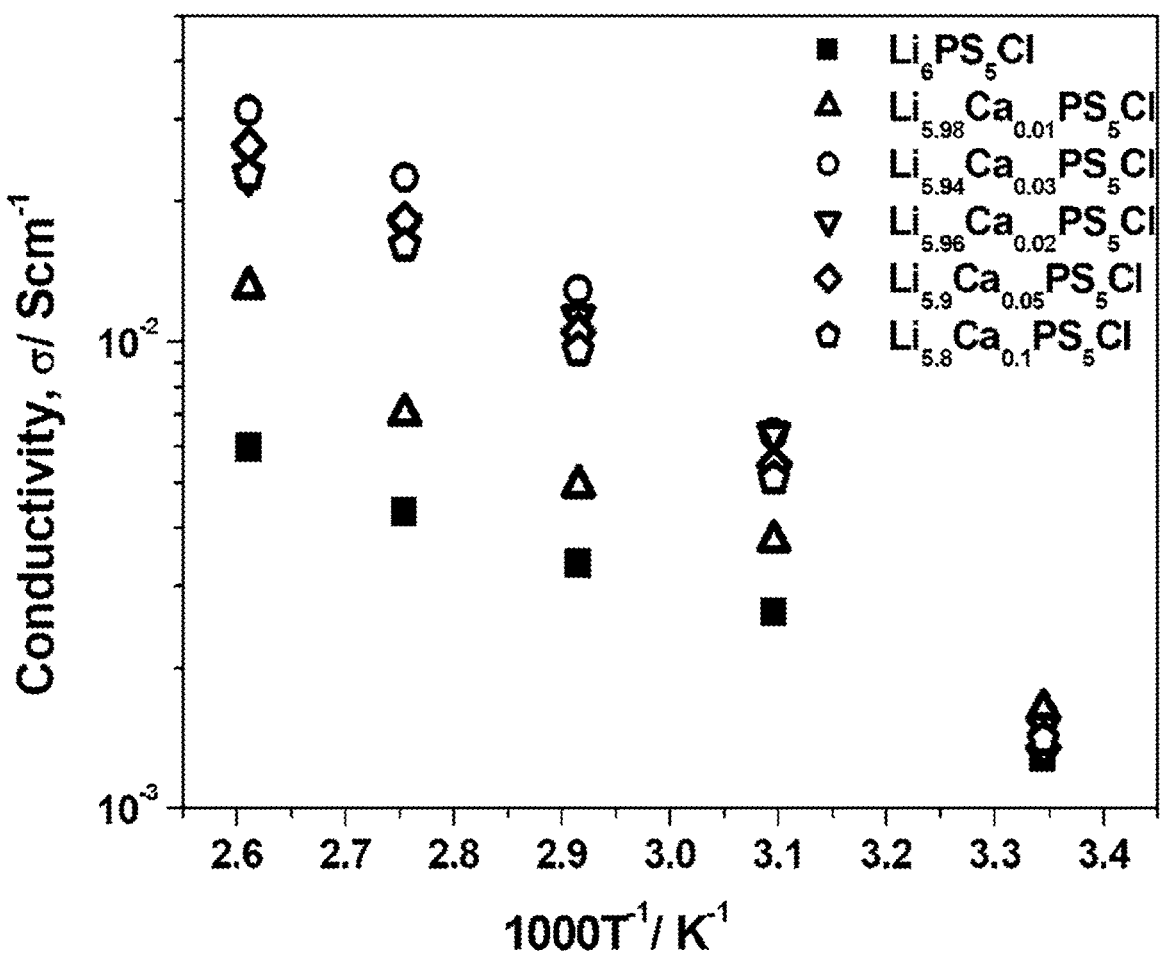
FIG. 8 is a graph showing temperature dependency of conductivity of solid electrolytes obtained in Experimental Examples 8 to 13.

FIG. 8 is a graph showing temperature dependency of the conductivity of solid electrolytes obtained in Experimental Examples 8 to 13.

Experimental Example 14 (Production of $Li_{5.94}Ba_{0.03}PS_5Cl$)

The same operation as in Experimental Example 11 was performed except that a lithium sulfide ($Li_2S$) powder, a barium sulfide (BaS) powder, a diphosphorus pentasulfide ($P_2S_5$) powder, and a lithium chloride (LiCl) powder were used so that a molar ratio of Li, Ba, P, S, and Cl was 5.94:0.03:1:5:1.

Figure 9:
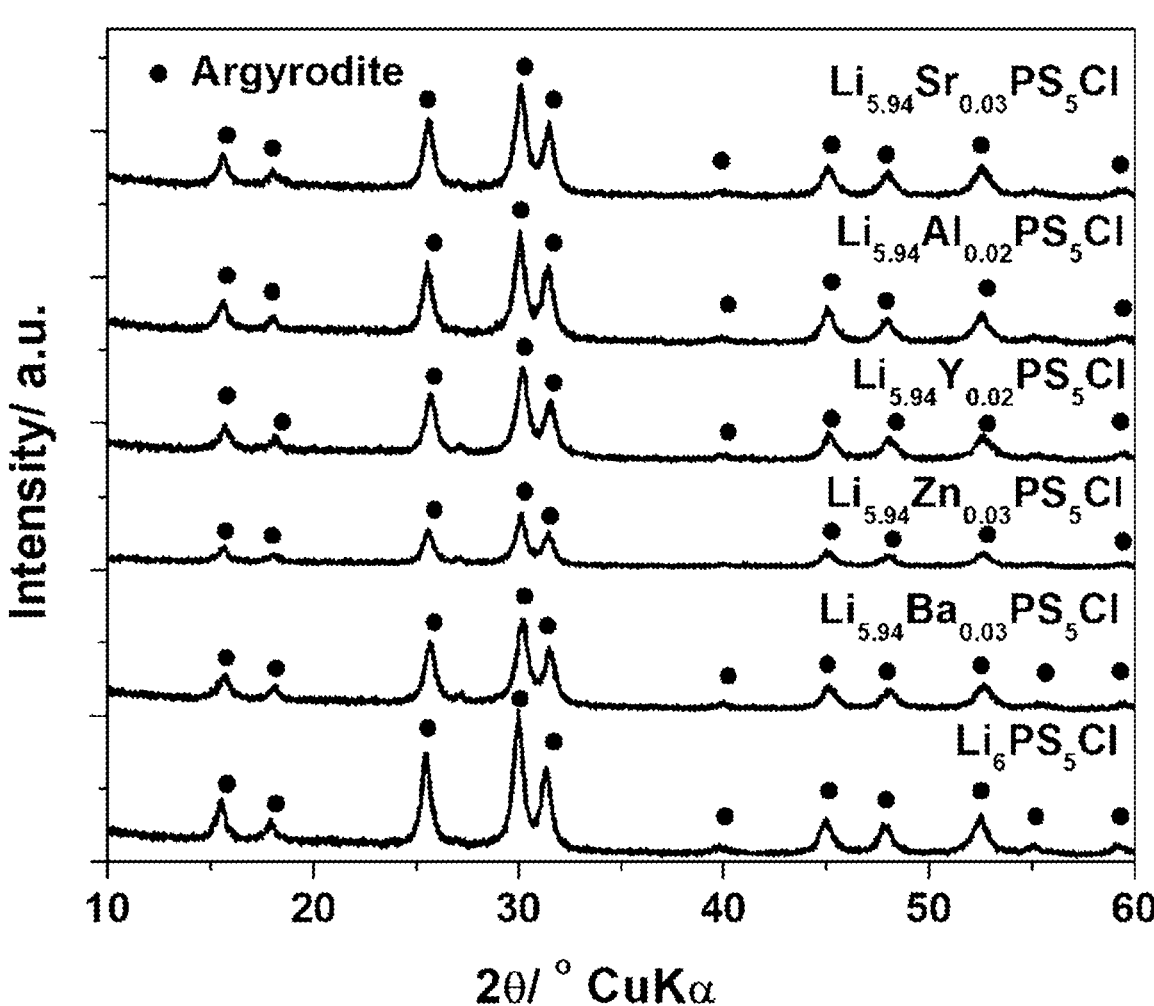
FIG. 9 shows X-ray diffraction images of solid compositions obtained in Experimental Examples 8 and 14 to 18.

As a result of X-ray diffraction measurement of the obtained reaction product (solid composition), the reaction product was found to have an argyrodite type crystal structure (see FIG. 9).

The conductivity of this solid composition as a solid electrolyte was measured and found to be $18.3 \times 10^{-3}$ S/cm at a temperature of 90° C.

Experimental Example 15 (Production of $Li_{5.94}Zn_{0.03}PS_5Cl$)

The same operation as in Experimental Example 11 was performed except that a lithium sulfide ($Li_2S$) powder, a zinc sulfide (ZnS) powder, a diphosphorus pentasulfide ($P_2S_5$) powder, and a lithium chloride (LiCl) powder were used so that a molar ratio of Li, Zn, P, S, and Cl was 5.94:0.03:1:5:1.

As a result of X-ray diffraction measurement of the obtained reaction product (solid composition), the reaction product was found to have an argyrodite type crystal structure (see FIG. 9).

The conductivity of this solid composition as a solid electrolyte was measured and found to be $24.3 \times 10^{-3}$ S/cm at a temperature of 90° C.

Experimental Example 16 (Production of $Li_{5.94}Y_{0.02}PS_5Cl$)

The same operation as in Experimental Example 11 was performed except that a lithium sulfide ($Li_2S$) powder, an yttrium sulfide ($Y_2S_3$) powder, a diphosphorus pentasulfide ($P_2S_5$) powder, and a lithium chloride (LiCl) powder were used so that a molar ratio of Li, Y, P, S, and Cl was 5.94:0.02:1:5:1.

As a result of X-ray diffraction measurement of the obtained reaction product (solid composition), the reaction product was found to have an argyrodite type crystal structure (see FIG. 9).

The conductivity of this solid composition as a solid electrolyte was measured and found to be $33.2 \times 10^{-3}$ S/cm at a temperature of 90° C.

Experimental Example 17 (Production of $Li_{5.94}Al_{0.02}PS_5Cl$)

The same operation as in Experimental Example 11 was performed except that a lithium sulfide ($Li_2S$) powder, an aluminum sulfide ($Al_2S_3$) powder, a diphosphorus pentasulfide ($P_2S_5$) powder, and a lithium chloride (LiCl) powder were used so that a molar ratio of Li, Al, P, S, and Cl was 5.94:0.02:1:5:1.

As a result of X-ray diffraction measurement of the obtained reaction product (solid composition), the reaction product was found to have an argyrodite type crystal structure (see FIG. 9).

The conductivity of this solid composition as a solid electrolyte was measured and found to be $18.4 \times 10^{-3}$ S/cm at a temperature of 90° C.

Experimental Example 18 (Production of $Li_{5.94}Sr_{0.03}PS_5Cl$)

The same operation as in Experimental Example 11 was performed except that a lithium sulfide ($Li_2S$) powder, a strontium chloride ($SrCl_2$) powder, a diphosphorus pentasulfide ($P_2S_5$) powder, and a lithium chloride (LiCl) powder were used so that a molar ratio of Li, Sr, P, S, and Cl was 5.94:0.03:1:5:1.

As a result of X-ray diffraction measurement of the obtained reaction product (solid composition), the reaction product was found to have an argyrodite type crystal structure (see FIG. 9).

The conductivity of this solid composition as a solid electrolyte was measured and found to be $21.4 \times 10^{-3}$ S/cm at a temperature of 90° C.

Figure 10:
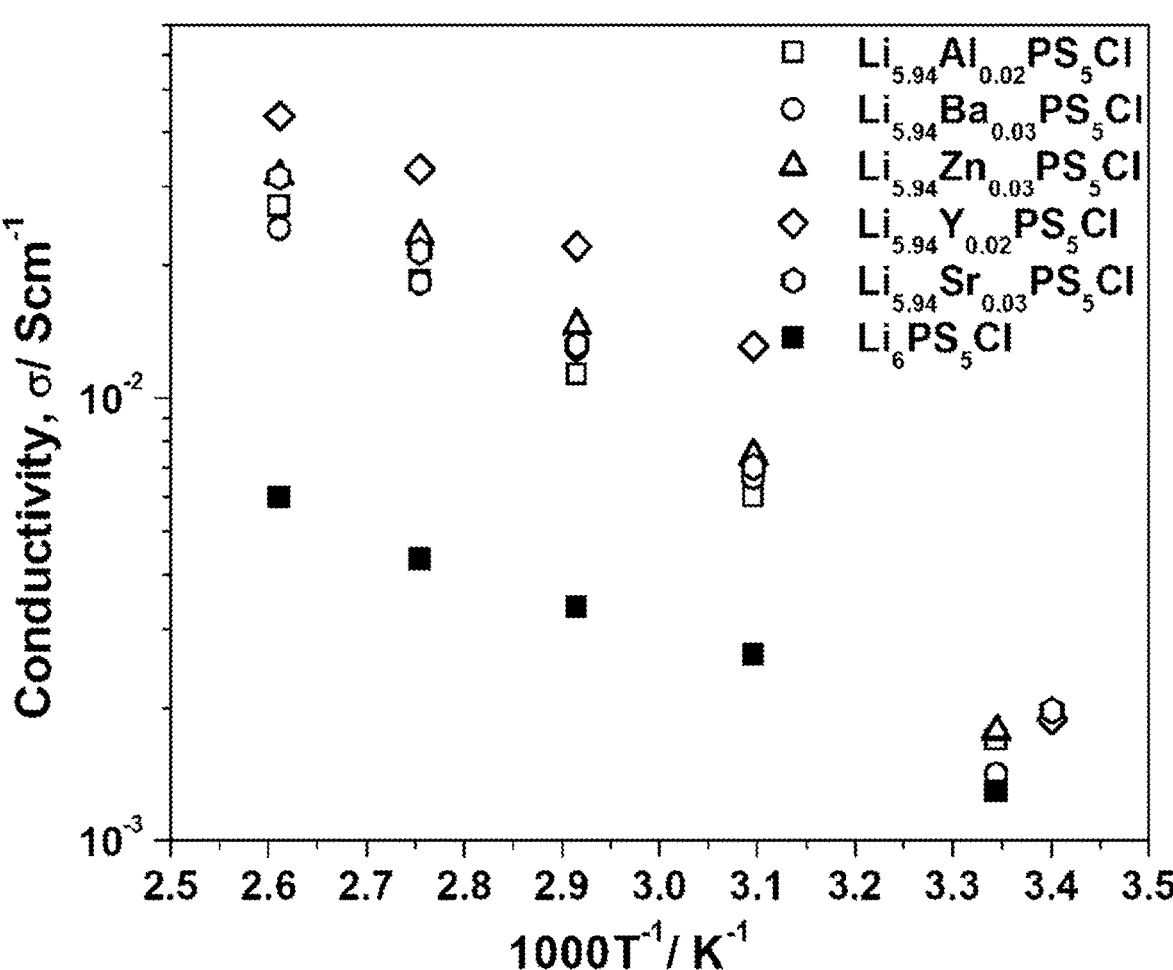
FIG. 10 is a graph showing temperature dependency of conductivity of solid electrolytes obtained in Experimental Examples 8 and 14 to 18.

FIG. 10 is a graph showing temperature dependency of the conductivity of solid electrolytes obtained in Experimental Examples 14 to 18.

Experimental Example 19 (Production of $Li_7P_3S_{11}$)

A lithium sulfide ($Li_2S$) powder and a diphosphorus pentasulfide ($P_2S_5$) powder were used as raw materials so that a molar ratio of Li, P, and S was 7:3:11, acetonitrile (40 ml) was used as a reaction solvent, and these materials were stirred at a temperature of 60° C. for 24 hours to synthesize a suspension of a precursor. The synthesized suspension was subjected to vacuum drying at a temperature of 160° C. to remove a solvent and obtain a precursor powder. The resulting precursor powder was heat-treated at a temperature of 270° C. under an argon gas atmosphere to obtain a reaction product (solid composition).

Figure 11:
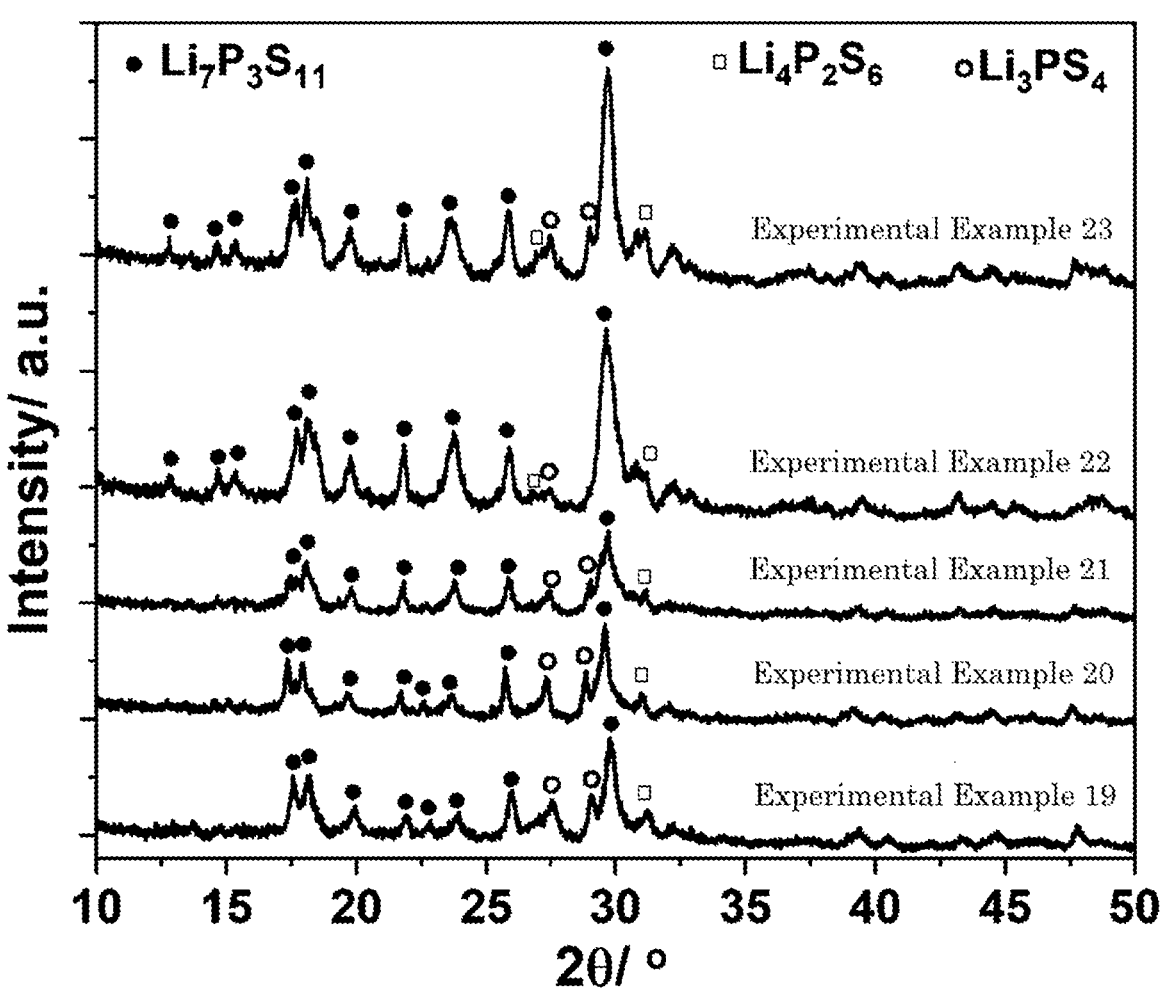
FIG. 11 shows X-ray diffraction images of solid compositions obtained in Experimental Examples 19 to 23.

As a result of X-ray diffraction measurement of the obtained reaction product (solid composition), it was found that the reaction product had a crystal structure of $Li_7P_3S_{11}$ while containing crystals of $Li_4P_2S_6$ and $Li_3PS_4$ slightly (see FIG. 11).

The conductivity of this solid composition as a solid electrolyte was measured and found to be $3.0 \times 10^{-3}$ S/cm at a temperature of 90° C.

Experimental Example 20 (Production of $Li_{6.99}Ca_{0.005}P_{3.00}S_{10.98}I_{0.01}$)

The same operation as in Experimental Example 19 was performed except that a lithium sulfide ($Li_2S$) powder, a diphosphorus pentasulfide ($P_2S_5$) powder, and a calcium iodide ($CaI_2$) powder were used as raw materials so that a molar ratio of Li, Ca, P, S, and I was 6.99:0.005:3.00:10.98: 0.01.

As a result of X-ray diffraction measurement of the obtained reaction product (solid composition), it was found that the reaction product had a crystal structure of $Li_7P_3S_{11}$ while containing crystals of $Li_4P_2S_6$ and $Li_3PS_4$ slightly (see FIG. 11). No peak derived from $CaI_2$ was observed.

The conductivity of this solid composition as a solid electrolyte was measured and found to be $4.0 \times 10^{-3}$ S/cm at a temperature of 90° C.

Experimental Example 21 (Production of $Li_{6.98}Ca_{0.01}P_{2.99}S_{10.97}I_{0.02}$)

The same operation as in Experimental Example 19 was performed except that a lithium sulfide ($Li_2S$) powder, a diphosphorus pentasulfide ($P_2S_5$) powder, and a calcium iodide ($CaI_2$) powder were used as raw materials so that a molar ratio of Li, Ca, P, S, and I was 6.98:0.01:2.99:10.97: 0.02.

As a result of X-ray diffraction measurement of the obtained reaction product (solid composition), it was found that the reaction product had a crystal structure of $Li_7P_3Sn$ while containing crystals of $Li_4P_2S_6$ and $Li_3PS_4$ slightly (see FIG. 11). No peak derived from $CaI_2$ was observed.

The conductivity of this solid composition as a solid electrolyte was measured and found to be $5.0 \times 10^{\times 3}$ S/cm at a temperature of 90° C.

Experimental Example 22 (Production of $Li_{6.96}Ca_{0.02}P_{2.98}S_{10.94}I_{0.04}$)

The same operation as in Experimental Example 19 was performed except that a lithium sulfide ($Li_2S$) powder, a diphosphorus pentasulfide ($P_2S_5$) powder, and a calcium iodide ($CaI_2$) powder were used as raw materials so that a molar ratio of Li, Ca, P, S, and I was 6.96:0.02:2.98:10.94: 0.04.

As a result of X-ray diffraction measurement of the obtained reaction product (solid composition), it was found that the reaction product had a crystal structure of $Li_7P_3S_{11}$ while containing crystals of $Li_4P_2S_6$ and $Li_3PS_4$ slightly (see FIG. 11). No peak derived from $CaI_2$ was observed.

The conductivity of this solid composition as a solid electrolyte was measured and found to be $14.0 \times 10^{-3}$ S/cm at a temperature of 90° C.

Experimental Example 23 (Production of $Li_{6.94}Ca_{0.03}P_{2.97}S_{10.90}I_{0.06}$)

The same operation as in Experimental Example 19 was performed except that a lithium sulfide ($Li_2S$) powder, a diphosphorus pentasulfide ($P_2S_5$) powder, and a calcium iodide ($CaI_2$) powder were used as raw materials so that a molar ratio of Li, Ca, P, S, and I was 6.94:0.03:2.97:10.90: 0.06.

As a result of X-ray diffraction measurement of the obtained reaction product (solid composition), it was found that the reaction product had a crystal structure of $Li_7P_3S_{11}$ while containing crystals of $Li_4P_2S_6$ and $Li_3PS_4$ slightly (see FIG. 11). No peak derived from $CaI_2$ was observed.

The conductivity of this solid composition as a solid electrolyte was measured and found to be $7.9 \times 10^{-3}$ S/cm at a temperature of 90° C.

Figure 12:
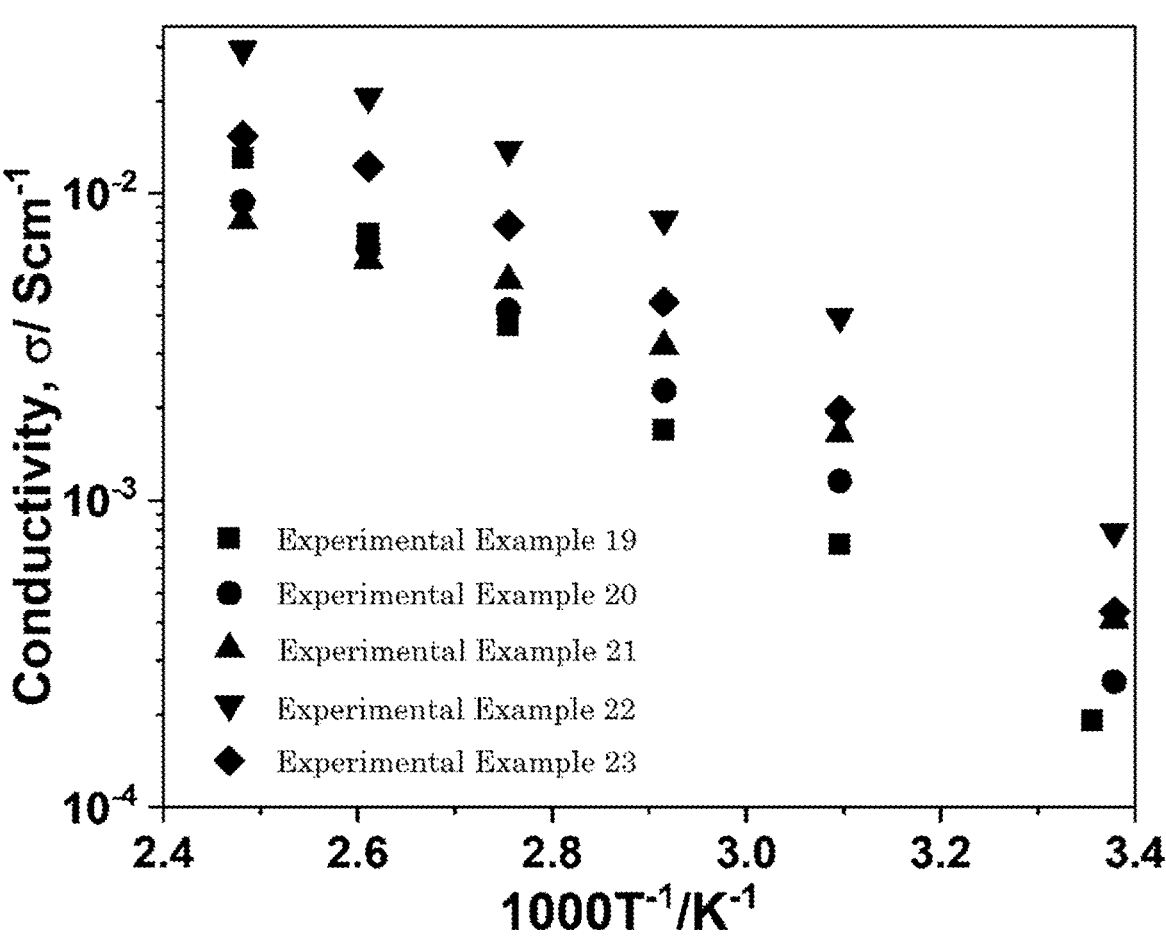
FIG. 12 is a graph showing temperature dependency of conductivity of solid electrolytes obtained in Experimental Examples 19 to 23.

FIG. 12 is a graph showing temperature dependency of the conductivity of solid electrolytes obtained in Experimental Examples 19 to 23.

Experimental Example 24

For the purpose of producing $Li_{6.90}Ca_{0.05}P_{2.96}S_{10.84}I_{0.1}$, the same operation as in Experimental Example 19 was performed except that a lithium sulfide ($Li_2S$) powder, a diphosphorus pentasulfide ($P_2S_5$) powder, and a calcium iodide ($CaI_2$) powder were used as raw materials so that a molar ratio of Li, Ca, P, S, and I was 6.90:0.05:2.96:10.84: 0.1.

Figure 13:
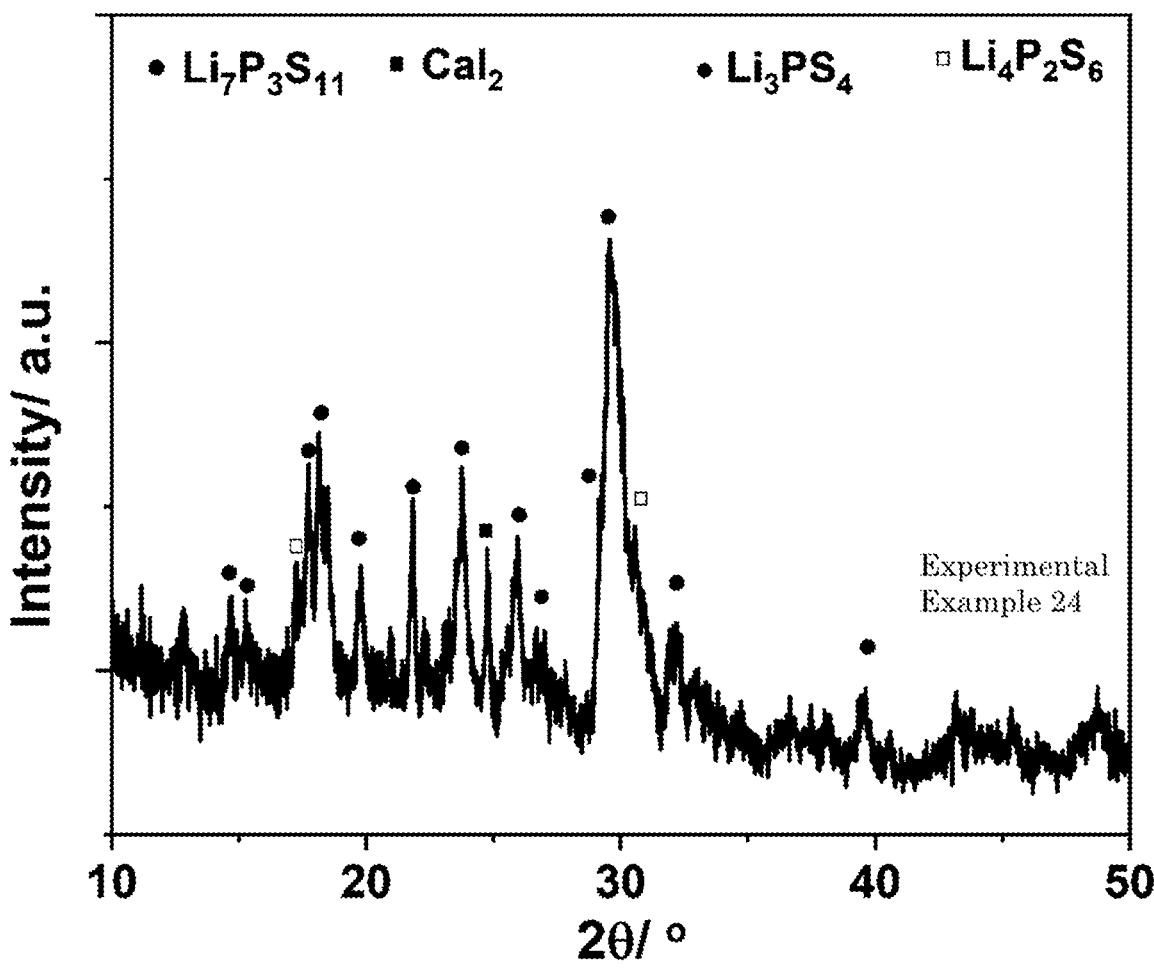
FIG. 13 shows X-ray diffraction images of solid compositions obtained in Experimental Examples 19 and 24.

As a result of X-ray diffraction measurement of the obtained reaction product (solid composition), it was found that the reaction product had a crystal structure of $Li_7P_3S_{11}$ while containing crystals of $Li_4P_2S_6$ and $Li_3PS_4$ slightly (see FIG. 13). Further, peaks derived from $CaI_2$ were observed, and it was found that the solid solubility limit was exceeded.

The conductivity of this solid composition as a solid electrolyte was measured and found to be $17.0 \times 10^{-3}$ S/cm at a temperature of 90° C.

In this example, peaks of $CaI_2$ were, as described above, observed by X-ray diffraction, but this was because the solid solubility limit of $CaI_2$ was exceeded. Therefore, the desired compound was not obtained, and it is considered that the obtained solid composition consists of the remaining raw material ($CaI_2$) and a compound in which a part of Li atom in $Li_7P_3S_{11}$ is substituted with Ca atom so that an upper limit of substitution of the Ca atom reaches. The conductivity of the solid composition was higher than that of the unsubstituted solid electrolyte ($Li_7P_3Sn$ of Experimental Example 19) with little influence of the remaining raw material.

Figure 14:
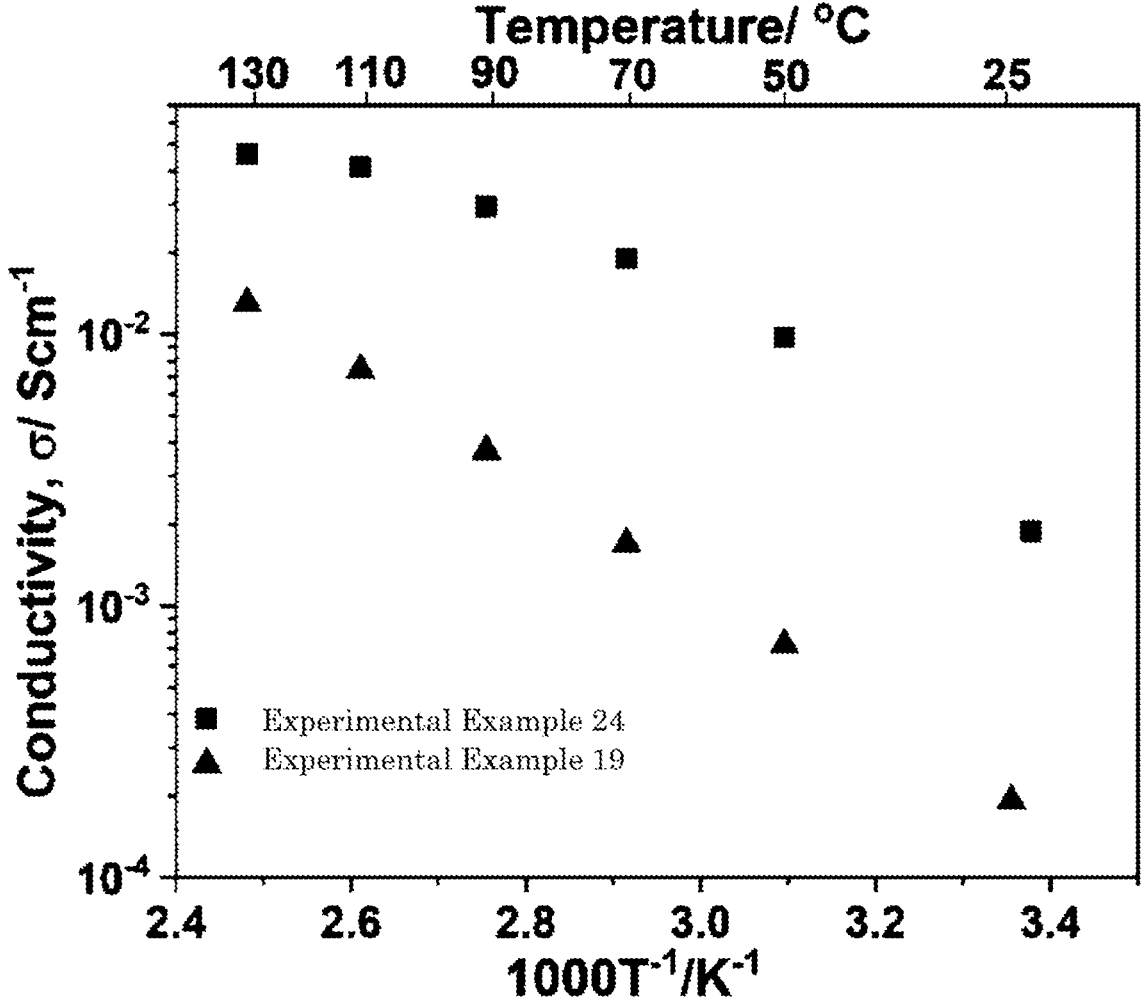
FIG. 14 is a graph showing temperature dependency of conductivity of solid electrolytes obtained in Experimental Examples 19 and 24.

FIG. 14 is a graph showing temperature dependency of the conductivity of solid electrolytes obtained in Experimental Examples 19 and 24.

Experimental Example 25 (Production of $Li_{6.985}Al_{0.005}P_{2.99}S_{10.98}I_{0.015}$)

The same operation as in Experimental Example 19 was performed except that a lithium sulfide ($Li_2S$) powder, a diphosphorus pentasulfide ($P_2S_5$) powder, and an aluminum iodide ($AlI_3$) powder were used as raw materials so that a molar ratio of Li, Al, P, S, and I was 6.985:0.005:2.99:10.98: 0.015.

Figure 15:
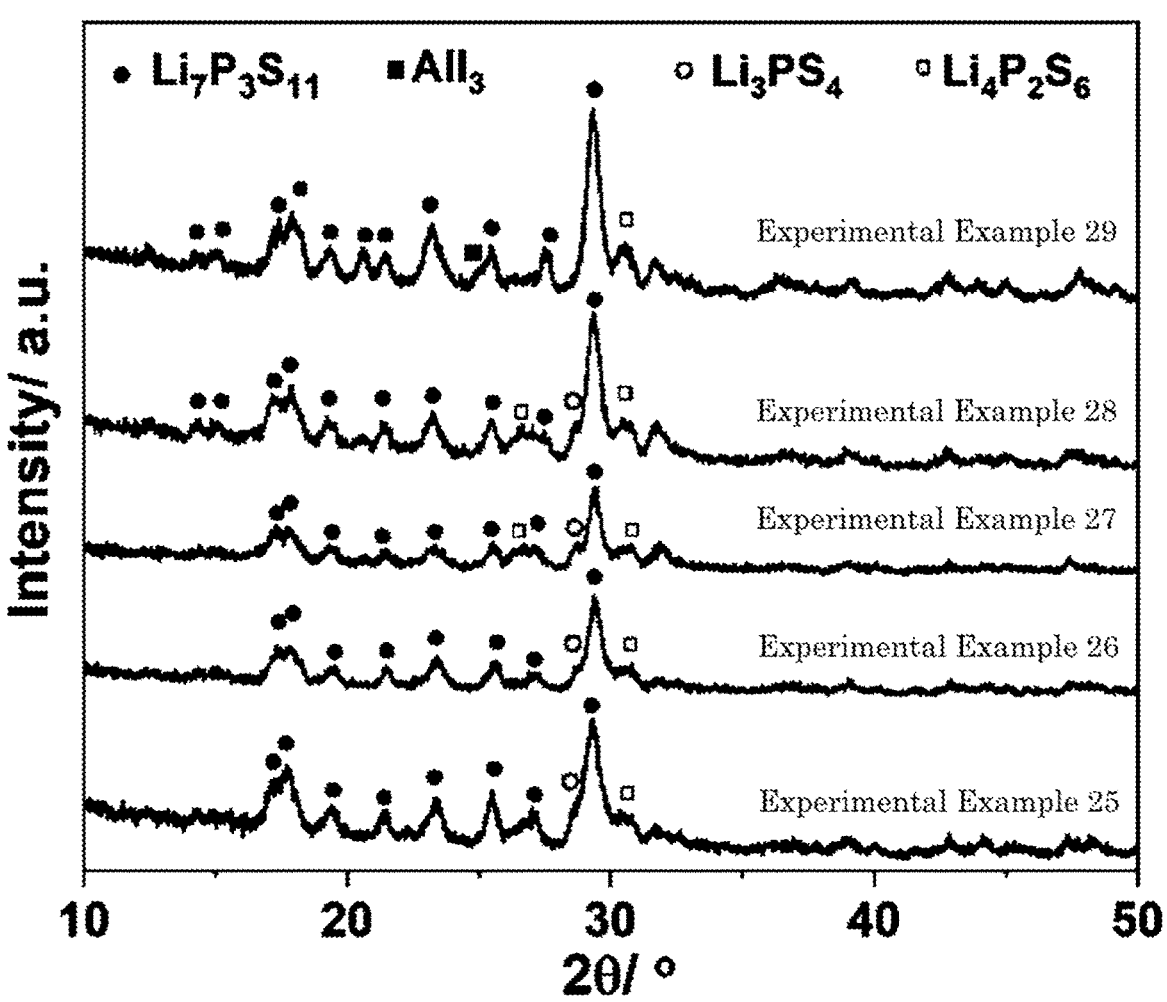
FIG. 15 shows X-ray diffraction images of solid compositions obtained in Experimental Examples 19 and 25 to 29.

As a result of X-ray diffraction measurement of the obtained reaction product (solid composition), it was found that the reaction product had a crystal structure of $Li_7P_3S_{11}$ while containing crystals of $Li_4P_2S_6$ and $Li_3PS_4$ slightly (see FIG. 15). No peak derived from $AlI_3$ was observed.

The conductivity of this solid composition as a solid electrolyte was measured and found to be $11.4 \times 10^{-3}$ S/cm at a temperature of 90° C.

Experimental Example 26 (Production of $Li_{6.97}Al_{0.01}P_{2.99}S_{10.95}I_{0.03}$)

The same operation as in Experimental Example 19 was performed except that a lithium sulfide ($Li_2S$) powder, a diphosphorus pentasulfide ($P_2S_5$) powder, and an aluminum iodide ($AlI_3$) powder were used as raw materials so that a molar ratio of Li, Al, P, S, and I was 6.97:0.01:2.99:10.95: 0.03.

As a result of X-ray diffraction measurement of the obtained reaction product (solid composition), it was found that the reaction product had a crystal structure of $Li_7P_3S_{11}$ while containing crystals of $Li_4P_2S_6$ and $Li_3PS_4$ slightly (see FIG. 15). No peak derived from $AlI_3$ was observed.

The conductivity of this solid composition as a solid electrolyte was measured and found to be $13.4 \times 10^{-3}$ S/cm at a temperature of 90° C.

Experimental Example 27 (Production of $Li_{6.94}Al_{0.02}P_{2.97}S_{10.90}I_{0.06}$)

The same operation as in Experimental Example 19 was performed except that a lithium sulfide ($Li_2S$) powder, a diphosphorus pentasulfide ($P_2S_5$) powder, and an aluminum iodide ($AlI_3$) powder were used as raw materials so that a molar ratio of Li, Al, P, S, and I was 6.94:0.02:2.97:10.90: 0.06.

As a result of X-ray diffraction measurement of the obtained reaction product (solid composition), it was found that the reaction product had a crystal structure of $Li_7P_3S_{11}$ while containing crystals of $Li_4P_2S_6$ and $Li_3PS_4$ slightly (see FIG. 15). No peak derived from $AlI_3$ was observed.

The conductivity of this solid composition as a solid electrolyte was measured and found to be $6.82 \times 10^{-3}$ S/cm at a temperature of 90° C.

Experimental Example 28 (Production of $Li_{6.925}Al_{0.025}P_{2.97}S_{10.88}I_{0.075}$)

The same operation as in Experimental Example 19 was performed except that a lithium sulfide ($Li_2S$) powder, a diphosphorus pentasulfide ($P_2S_5$) powder, and an aluminum iodide ($AlI_3$) powder were used as raw materials so that a molar ratio of Li, Al, P, S, and I was 6.925:0.025:2.97:10.88: 0.075.

As a result of X-ray diffraction measurement of the obtained reaction product (solid composition), it was found that the reaction product had a crystal structure of $Li_7P_3S_{11}$ while containing crystals of $Li_4P_2S_6$ and $Li_3PS_4$ slightly (see FIG. 15).

The conductivity of this solid composition as a solid electrolyte was measured and found to be $10.7 \times 10^{-3}$ S/cm at a temperature of 90° C.

Experimental Example 29

For the purpose of producing $Li_{6.91}Al_{0.03}P_{2.96}S_{10.86}I_{0.09}$, the same operation as in Experimental Example 19 was performed except that a lithium sulfide ($Li_2S$) powder, a diphosphorus pentasulfide ($P_2S_5$) powder, and an aluminum iodide ($AlI_3$) powder were used as raw materials so that a molar ratio of Li, Al, P, S, and I was 6.91:0.03:2.96:10.86: 0.09.

As a result of X-ray diffraction measurement of the obtained reaction product (solid composition), it was found that the reaction product had a crystal structure of $Li_7P_3S_{11}$ while containing crystals of $Li_4P_2S_6$ and $Li_3PS_4$ slightly (see FIG. 15). Further, a peak derived from $AlI_3$ was observed, and it was found that the solid solubility limit was exceeded.

The conductivity of this solid composition as a solid electrolyte was measured and found to be $15.0 \times 10^{-3}$ S/cm at a temperature of 90° C.

In this example, peaks of $AlI_3$ were, as described above, observed by X-ray diffraction, but this was because the solid solubility limit of $AlI_3$ was exceeded. Therefore, the desired compound was not obtained, and it is considered that the obtained solid composition consists of the remaining raw material ($AlI_3$) and a compound in which a part of Li atom in $Li_7P_3S_{11}$ is substituted with Al atom so that an upper limit of substitution of the Al atom reaches. The conductivity of the solid composition was higher than that of the unsubstituted solid electrolyte ($Li_7P_3S_{11}$ of Experimental Example 19) with little influence of the remaining raw material.

Figure 16:
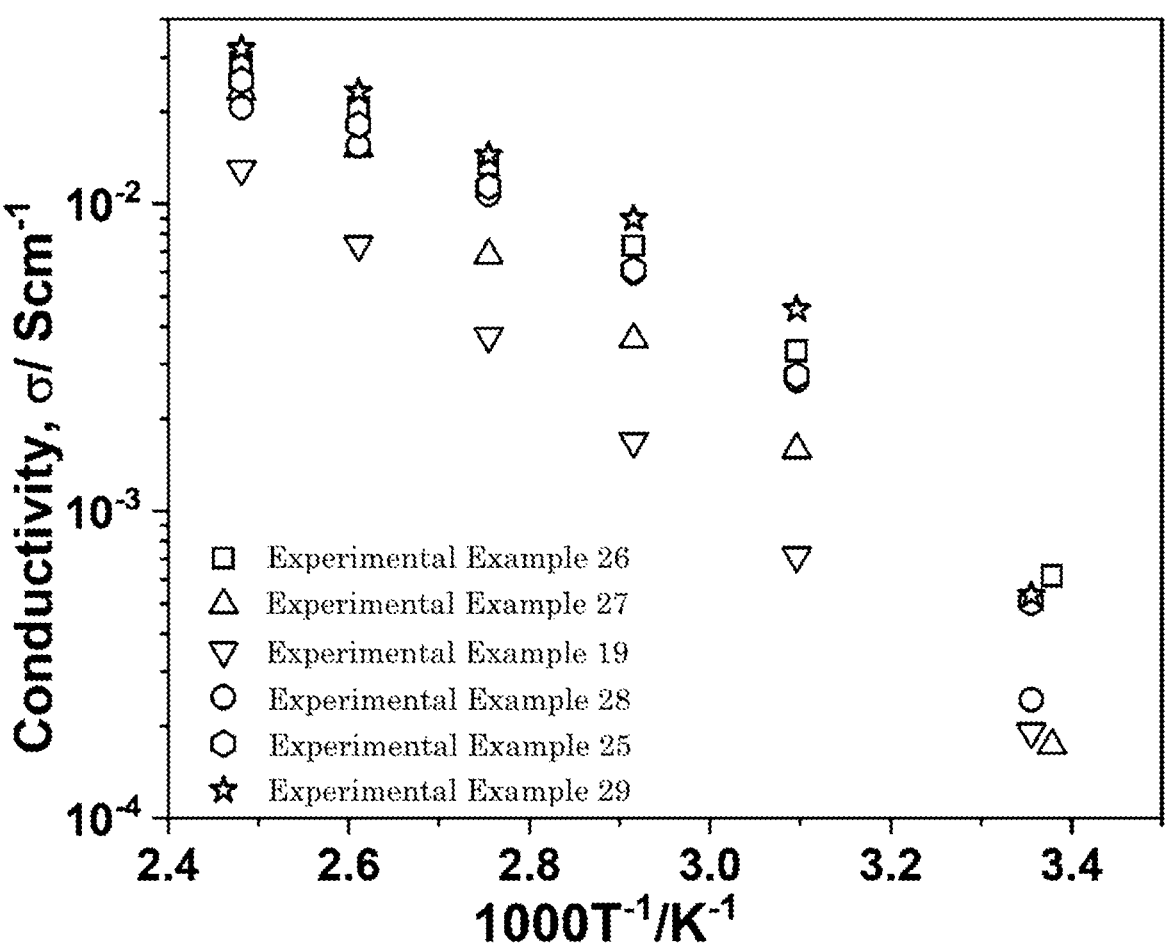
FIG. 16 is a graph showing temperature dependency of conductivity of solid electrolytes obtained in Experimental Examples 19 and 25 to 29.

FIG. 16 is a graph showing temperature dependency of the conductivity of solid electrolytes obtained in Experimental Examples 19 and 25 to 29.

Experimental Example 30 (Production of $Li_{6.98}Z_{0.01}P_{2.99}S_{10.97}I_{0.02}$)

The same operation as in Experimental Example 19 was performed except that a lithium sulfide ($Li_2S$) powder, a diphosphorus pentasulfide ($P_2S_5$) powder, and a zinc iodide ($ZnI_2$) powder were used as raw materials so that a molar ratio of Li, Zn, P, S, and I was 6.98:0.01:2.99:10.97:0.02.

Figure 17:
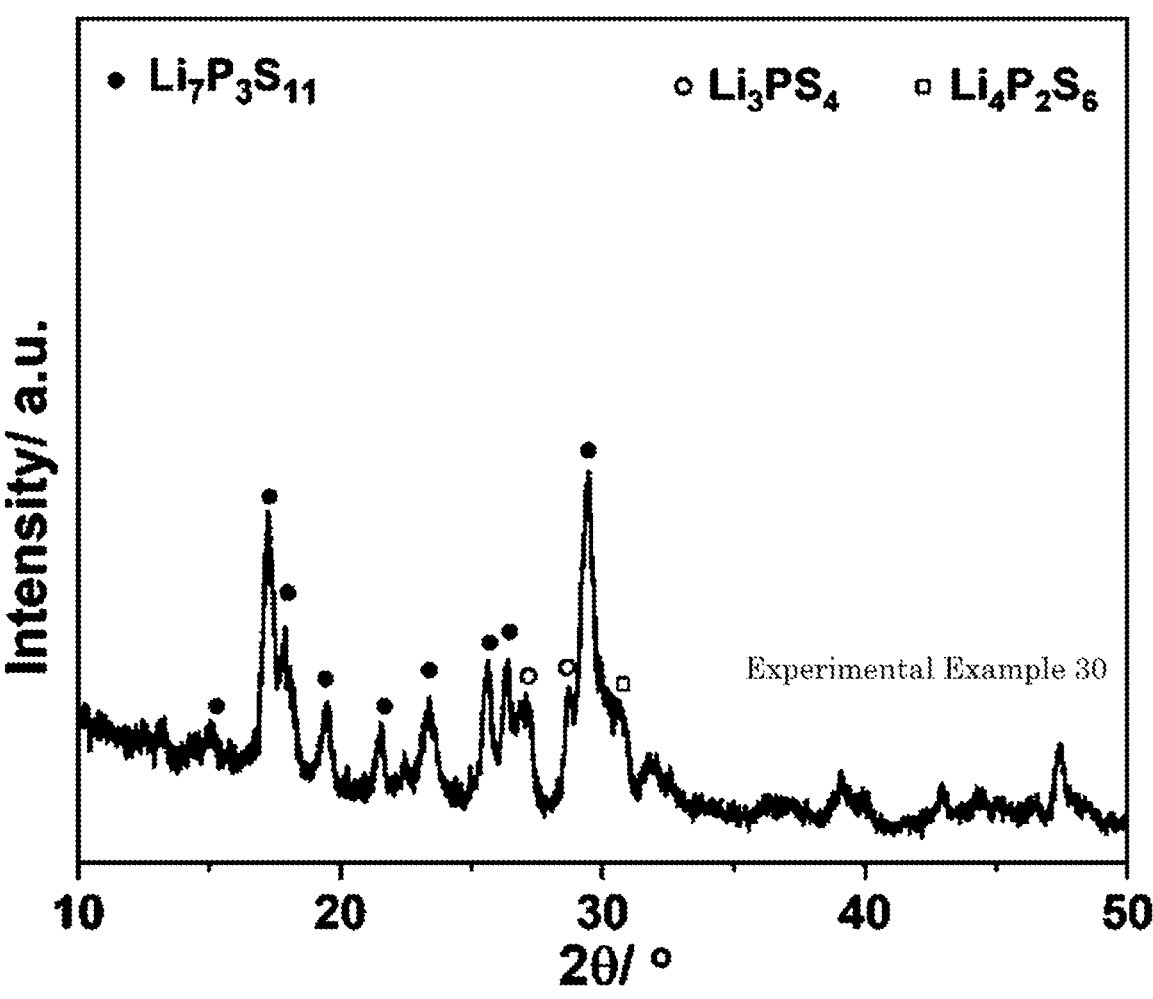
FIG. 17 shows X-ray diffraction images of solid compositions obtained in Experimental Examples 19 and 30.

As a result of X-ray diffraction measurement of the obtained reaction product (solid composition), it was found that the reaction product had a crystal structure of $Li_7P_3S_{11}$ while containing crystals of $Li_4P_2S_6$ and $Li_3PS_4$ slightly (see FIG. 17). No peak derived from $ZnI_2$ was observed.

The conductivity of this solid composition as a solid electrolyte was measured and found to be $9.2 \times 10^{-3}$ S/cm at a temperature of 90° C.

Figure 18:
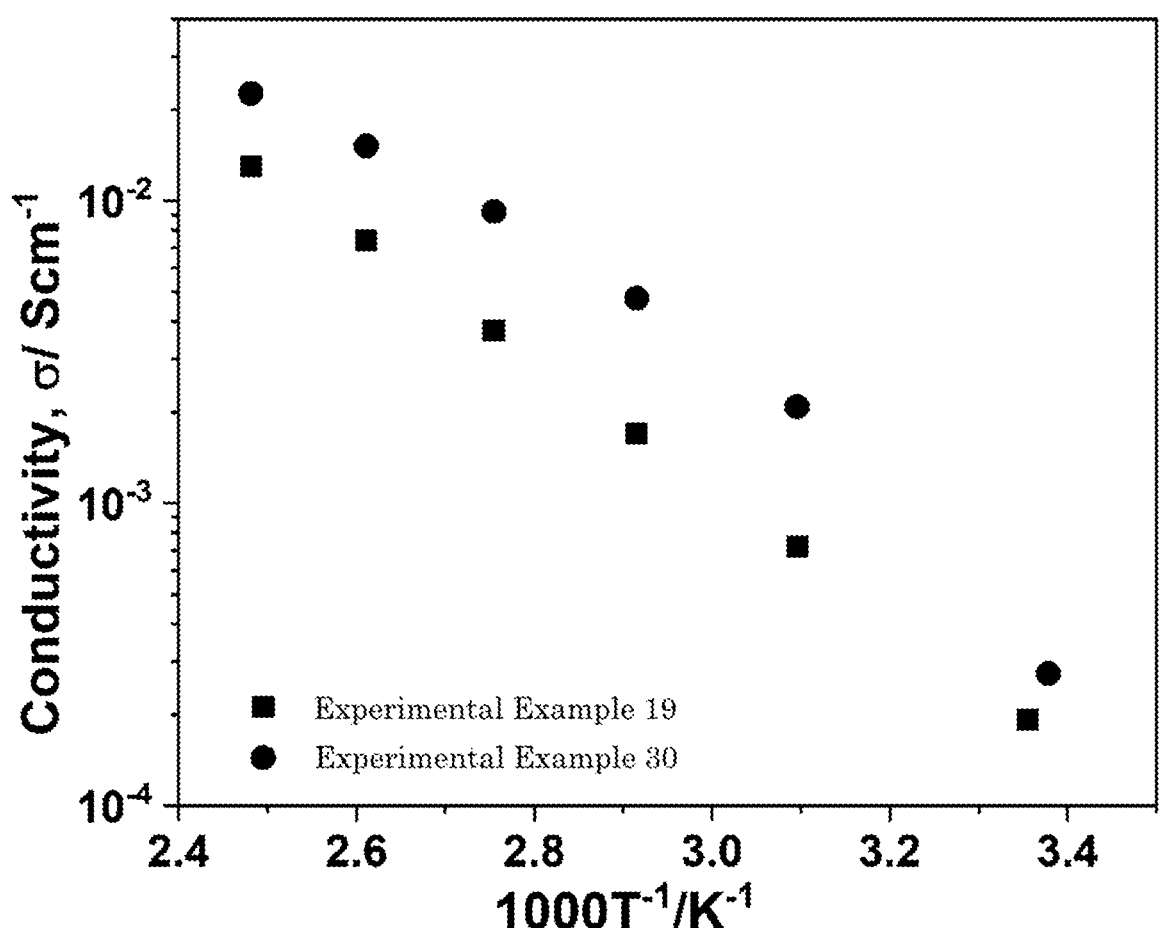
FIG. 18 is a graph showing temperature dependency of conductivity of solid electrolytes obtained in Experimental Examples 19 and 30.

FIG. 18 is a graph showing temperature dependency of the conductivity of solid electrolytes obtained in Experimental Examples 19 and 30.

INDUSTRIAL APPLICABILITY

The solid electrolyte of the present disclosure is suitable as a constituent material of a lithium ion battery constituting a power source for home electric appliances such as personal computers and cameras, portable electronic devices or communication devices such as power storage devices and mobile phones, electric tools such as power tools, and the like, and further a large battery mounted on electric vehicles (EV), hybrid electric vehicles (HEV) and the like, that is, a constituent material of an electrode for a lithium ion battery or an electrolyte layer.

REFERENCE SIGNS LIST

11: Positive electrode

13: Negative electrode

15: Electrolyte layer

17: Positive electrode current collector

19: Negative electrode current collector

21: Housing

23: Heating element

100: Lithium ion battery

The invention claimed is:

1. A solid electrolyte comprising:
   a compound in which a part of Li atom in $Li_6PS_5Cl$ is substituted with at least one type of atom selected from the group consisting of Sr, Zn, and Y; and
   at least one compound selected from a group consisting of a compound in which a part of Li atom in $Li_3PS_4$ is substituted with a polyvalent atom (provided that Mg is excluded), and a compound in which a part of Li atom in $Li_7P_3S_{11}$ is substituted with a polyvalent atom.

2. An electrode for a lithium ion battery comprising the solid electrolyte according to claim 1.

3. A lithium ion battery comprising the electrode for a lithium ion battery according to claim 2.

4. The solid electrolyte according to claim 1, comprising the compound in which a part of Li atom in $Li_3PS_4$ is substituted with a polyvalent atom (provided that Mg is excluded).

5. The solid electrolyte according to claim 1, comprising the compound in which a part of Li atom in $Li_7P_3S_{11}$ is substituted with a polyvalent atom.

6. A solid electrolyte comprising:
   a compound in which a part of Li atom in $Li_6PS_5Cl$ is substituted with at least one type of atom selected from the group consisting of Zn and Y.

7. An electrode for a lithium ion battery comprising the solid electrolyte according to claim 6.

8. A lithium ion battery comprising the electrode for a lithium ion battery according to claim 7.

9. The solid electrolyte according to claim 6, further comprising at least one compound selected from a group consisting of a compound in which a part of Li atom in $Li_3PS_4$ is substituted with a polyvalent atom (provided that Mg is excluded), and a compound in which a part of Li atom in $Li_7P_3S_{11}$ is substituted with a polyvalent atom.

10. The solid electrolyte according to claim 9, comprising the compound in which a part of Li atom in $Li_3PS_4$ is substituted with a polyvalent atom (provided that Mg is excluded).

11. The solid electrolyte according to claim 9, comprising the compound in which a part of Li atom in $Li_7P_3S_{11}$ is substituted with a polyvalent atom.

12. A solid electrolyte comprising:
   a compound in which a part of Li atom in $Li_6PS_5Cl$ is substituted with both Sr and at least one type of atom selected from the group consisting of Zn and Y.

13. An electrode for a lithium ion battery comprising the solid electrolyte according to claim 12.

14. A lithium ion battery comprising the electrode for a lithium ion battery according to claim 13.

15. The solid electrolyte according to claim 12, further comprising at least one compound selected from a group consisting of a compound in which a part of Li atom in $Li_3PS_4$ is substituted with a polyvalent atom (provided that Mg is excluded), and a compound in which a part of Li atom in $Li_7P_3S_{11}$ is substituted with a polyvalent atom.

16. The solid electrolyte according to claim 12, comprising the compound in which a part of Li atom in $Li_3PS_4$ is substituted with a polyvalent atom (provided that Mg is excluded).

17. The solid electrolyte according to claim 12, comprising the compound in which a part of Li atom in $Li_7P_3S_{11}$ is substituted with a polyvalent atom.

\* \* \* \* \*